US012323578B2

United States Patent
Wang et al.

(10) Patent No.: US 12,323,578 B2
(45) Date of Patent: Jun. 3, 2025

(54) TYPES OF REFERENCE PICTURES IN REFERENCE PICTURE LISTS

(71) Applicant: Huawei Technologies Co., Ltd., Shenzhen (CN)

(72) Inventors: Ye-Kui Wang, San Diego, CA (US); Fnu Hendry, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 17/566,464

(22) Filed: Dec. 30, 2021

(65) Prior Publication Data

US 2022/0166970 A1 May 26, 2022

Related U.S. Application Data

(63) Continuation of application No. PCT/US2020/040775, filed on Jul. 2, 2020.
(Continued)

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/172* (2014.11); *H04N 19/174* (2014.11)

(58) Field of Classification Search
CPC .. H04N 19/105; H04N 19/159; H04N 19/172; H04N 19/174; H04N 19/114;
(Continued)

(56) References Cited

U.S. PATENT DOCUMENTS 7,924,920 B2    4/2011  Hsu
2010/0091845 A1*  4/2010  Jeon .................. H04N 19/105
                                                        375/240.12
(Continued)

FOREIGN PATENT DOCUMENTS

WO    2014162747 A1   10/2014
WO    2015053286 A1    4/2015

OTHER PUBLICATIONS

Benjamin Bross et al., Versatile Video CODING (Draft 5) Geneva, CH, Mar. 2019 -JVET-N1001-v10 (Year: 2019).*
(Continued)

*Primary Examiner* — Dramos Kalapodas
(74) *Attorney, Agent, or Firm* — Conley Rose, P.C.

(57) ABSTRACT

A method of decoding includes receiving a coded video bitstream including a current picture; deriving a first reference picture list and a second reference picture list for each slice of the current picture; determining that the current picture is a clean random access (CRA) picture, the CRA picture signifying that there shall be no picture referred to by an entry in the first reference picture list or the second reference picture list that precedes, in an output order or a decoding order, any preceding intra random access point (IRAP) picture in the decoding order; and decoding each slice of the CRA picture based on one or both of the first reference picture list and the second reference picture list.

13 Claims, 23 Drawing Sheets

Related U.S. Application Data

(60) Provisional application No. 62/870,588, filed on Jul. 3, 2019.

(51) Int. Cl.
 H04N 19/172 (2014.01)
 H04N 19/174 (2014.01)

(58) Field of Classification Search
 CPC ...... H04N 19/44; H04N 19/513; H04N 19/58; H04N 19/70
 See application file for complete search history.

(56) References Cited

U.S. PATENT DOCUMENTS

| | | | |
|---|---|---|---|
| 2013/0077677 | A1 | 3/2013 | Wang et al. |
| 2014/0003536 | A1 | 1/2014 | Wang et al. |
| 2014/0301485 | A1* | 10/2014 | Ramasubramonian ...... H04N 19/30 375/240.27 |
| 2015/0103927 | A1 | 4/2015 | Hannuksela |
| 2015/0195563 | A1* | 7/2015 | Ramasubramonian ...... H04N 19/172 375/240.15 |
| 2015/0195564 | A1* | 7/2015 | Ramasubramonian ...... H04N 19/30 375/240.15 |
| 2015/0215632 | A1 | 7/2015 | Choi |
| 2015/0237377 | A1* | 8/2015 | Hendry .......... H04N 19/70 375/240.25 |
| 2016/0191931 | A1* | 6/2016 | Hannuksela ...... H04N 19/105 375/240.12 |
| 2016/0234516 | A1* | 8/2016 | Hendry .......... H04N 19/70 |
| 2017/0094302 | A1* | 3/2017 | Hendry .......... H04N 19/114 |
| 2017/0105004 | A1 | 4/2017 | Chen et al. |
| 2017/0237999 | A1* | 8/2017 | Hendry .......... H04N 19/39 375/240.26 |
| 2019/0098301 | A1* | 3/2019 | Lee ............. H04N 19/159 |

OTHER PUBLICATIONS

Benjamin Bross, Versatile Video Coding (Draft 8), Joint Video Experts Team (JVET)of ITU-T SG 16 WP 3 and ISO/IEC JTC 1/SC 29/WG 11 17th Meeting: Brussels, BE, Jan. 7-17, 2020 Document: JVET-Q2001-v7, total 493 pages (Year: 2020).*
Hendry, Futurewei Technologies Inc.AHG17: RPL Constraints for RASL and RADL Pictures, Joint Video Experts Team (JVET)of ITU-T SG 16 WP 3 and ISO/IEC JTC 1/SC 29/WG 11 16th Meeting: Geneva, CH, Oct. 1-11, 2019 JVET-P0123-v1, total 3 pages. (Year: 2019).*
Rickard Sjöberg, et al., AHG17: Bitstream constraints on RPL and GDR, Joint Video Experts Team (JVET) of ITU-T SG 16 WP 3 and ISO/IEC Jtc 1/SC 29/WG 11, 16th Meeting: Geneva, CH, Oct. 1-11, 2019, Document: JVET-P0356, total 7 pages. This publication dated Oct. 1-11, 2019. (Year: 2019).*
"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.
"High Efficiency Video Coding," Series H: Audiovisual and Multimedia Systems Infrastructure of Audiovisual Services—Coding of Moving Video, ITU-T H.265, Feb. 2018, 692 pages.
"Line Transmission of Non-Telephone Signals, Video Codec for Audiovisual Services at p × 64 kbits," ITU-T Recommendation H.261, Mar. 1993, 29 pages.
"Transmission of Non-Telephone Signals, Information Technology—Generic Coding of Moving Pictures and Associated Audio Information: Video," ITU-T H.262, Jul. 1995, 211 pages.
"Video Coding for Low Bit Rate Communication," Series H: Audiovisual and Multimedia Systems Infrastructure of Audiovisual Services—Coding of Moving Video, ITU-T H.263, Jan. 2005, 226 pages.
Bross, et al., "Versatile Video Coding (Draft 5)," Joint Video Experts Team (JVET) of ITU-T SG 16 WP 3 and ISO/IEC UTC 1/SC 29/WG 11, 14th Meeting: Geneva, CH, Mar. 19-27, 2019, JVET-N1001-v3, 371 pages.
Document: JVET-N1001-v10, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 15 pages.
Sjoberg, Rickard et al, "AHG17: Bitstream constraints on RPL and GDR," Joint Video Experts Team (JVET) of ITU-T SG 16 WP 3 and ISO/IEC JTC 1/SC 29/WG 11, 16th Meeting: Geneva, CH, Oct. 1-11, 2019, JVET-P0356 (version 2), 14 pages.
Hendry, Futurewei Technologies Inc.AHG17: RPL Constraints for RASL and RADL Pictures, Joint Video Experts Team (JVET)of ITU-T SG 16 WP 3 and ISO/IEC JTC 1/SC 29/WG 11 16th Meeting: Geneva, CH, Oct. 1-11, 2019 JVET-P0123-v1, total 3 pages.
Editors, Benjamin Bross, Versatile Video Coding (Draft 8), Joint Video Experts Team (JVET)of ITU-T SG 16 WP 3 and ISO/IEC JTC 1/SC 29/WG 11 17th Meeting: Brussels, BE, Jan. 7-17, 2020 Document: JVET-Q2001-v7, total 493 pages.
Rickard Sjöberg, et al., AHG17: Bitstream constraints on RPL and GDR, Joint Video Experts Team (JVET) of ITU-T SG 16 WP 3 and ISO/IEC JTC 1/SC 29/WVG 11, 16th Meeting: Geneva, CH, Oct. 1-11, 2019, Document: JVET-P0356, total 7 pages.

* cited by examiner

2000

Derive a first reference picture list and a second reference picture list when a current picture is a trailing picture that follows, in both decoding order and output order, one or more leading pictures associated with a same intra random access point (IRAP) picture, wherein there shall be no picture referred to by an entry in the first reference picture list or the second reference picture list that precedes the same IRAP picture in the output order or the decoding order — 2002

Encode the trailing picture and one or both of the first reference picture list and the second reference picture list into a video bitstream — 2004

Store the video bitstream pending transmission toward a video decoder — 2006

FIG. 20

TYPES OF REFERENCE PICTURES IN REFERENCE PICTURE LISTS

CROSS-REFERENCE TO RELATED APPLICATIONS

This patent application is a continuation of International Application No. PCT/US2020/040775 filed on Jul. 2, 2020 by Futurewei Technologies, Inc., and titled "Types of Reference Pictures in Reference Picture Lists," which claims the benefit of U.S. Provisional Patent Application No. 62/870,588 filed Jul. 3, 2019, by Ye-Kui Wang, et al., and titled "Types of Reference Pictures in Reference Picture Lists," which is hereby incorporated by reference.

TECHNICAL FIELD

The present disclosure is generally related to reference picture management in video coding, and is specifically related to restricting reference picture lists from including certain types of reference pictures.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding implemented by a video decoder. The method includes receiving, by the video decoder, a coded video bitstream including a current picture; deriving, by the video decoder, a first reference picture list and a second reference picture list for each slice of the current picture; determining, by the video decoder, that the current picture is a clean random access (CRA) picture, the CRA picture signifying that there shall be no picture referred to by an entry in the first reference picture list or the second reference picture list that precedes, in an output order or a decoding order, any preceding intra random access point (TRAP) picture in the decoding order; and decoding, by the video decoder, each slice of the CRA picture based on one or both of the first reference picture list and the second reference picture list.

The method provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the preceding IRAP picture precedes the CRA picture in the output order or the decoding order.

Optionally, in any of the preceding aspects, another implementation of the aspect provides that the preceding IRAP picture starts a coded video sequence (CVS) that contains the CRA picture.

Optionally, in any of the preceding aspects, another implementation of the aspect provides that the CRA picture is decoded using intra prediction.

Optionally, in any of the preceding aspects, another implementation of the aspect provides that one or more pictures following the CRA picture in the decoding order are decoded using inter prediction.

Optionally, in any of the preceding aspects, another implementation of the aspect provides that the first reference picture list is designated RefPicList[0] and the second reference picture list is designated RefPicList[1].

Optionally, in any of the preceding aspects, another implementation of the aspect provides further comprising displaying, on a display of the video decoder, an image generated based on the CRA picture.

A second aspect relates to a method of encoding implemented by a video encoder. The method includes deriving, by the video encoder, a first reference picture list and a second reference picture list when a current picture is a clean random access (CRA) picture, wherein there shall be no picture referred to by an entry in the first reference picture list or the second reference picture list that precedes, in an output order or a decoding order, any preceding intra random access point (IRAP) picture in the decoding order; encoding, by the video encoder, the CRA picture and one or both of the first reference picture list and the second reference picture list into a video bitstream; and storing, by the video encoder, the video bitstream pending transmission toward a video decoder.

The method provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the preceding IRAP picture precedes the CRA picture in the output order or the decoding order.

Optionally, in any of the preceding aspects, another implementation of the aspect provides that the preceding IRAP picture starts a coded video sequence (CVS) that contains the CRA picture.

Optionally, in any of the preceding aspects, another implementation of the aspect provides that the CRA picture is encoded using intra prediction.

Optionally, in any of the preceding aspects, another implementation of the aspect provides further comprising encoding one or more pictures following the CRA picture in the decoding order using inter prediction.

Optionally, in any of the preceding aspects, another implementation of the aspect provides that the first reference picture list is designated RefPicList[0] and the second reference picture list is designated RefPicList[1].

Optionally, in any of the preceding aspects, another implementation of the aspect provides transmitting the video bitstream toward the video decoder.

A third aspect relates to a decoding device. The decoding device includes a receiver configured to receive a coded video bitstream including a current picture; a memory coupled to the receiver, the memory storing instructions; and a processor coupled to the memory, the processor configured to execute the instructions to cause the decoding device to: derive a first reference picture list and a second reference picture list for each slice of the current picture; determine that the current picture is a clean random access (CRA) picture, the CRA picture signifying that there shall be no picture referred to by an entry in the first reference picture list or the second reference picture list that precedes, in an output order or a decoding order, any preceding intra random access point (IRAP) picture in the decoding order; and decode each slice of the CRA picture based on one or both of the first reference picture list and the second reference picture list.

The decoding device provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the preceding IRAP picture precedes the CRA picture in the output order or the decoding order.

Optionally, in any of the preceding aspects, another implementation of the aspect provides that the preceding IRAP picture starts a coded video sequence (CVS) that contains the CRA picture, the CRA picture is decoded using intra prediction, and one or more pictures following the CRA picture in the decoding order are decoded using inter prediction.

Optionally, in any of the preceding aspects, another implementation of the aspect provides further comprising a display configured to display an image based on the CRA picture as decoded.

A fourth aspect relates to an encoding device. The encoding device includes a memory containing instructions; a processor coupled to the memory, the processor configured to implement the instructions to cause the encoding device to: derive a first reference picture list and a second reference picture list when a current picture comprises a clean random access (CRA) picture, wherein there shall be no picture referred to by an entry in the first reference picture list or the second reference picture list that precedes, in an output order or a decoding order, any preceding intra random access point (TRAP) picture in the decoding order; encode the CRA picture and one or both of the first reference picture list and the second reference picture list into a video bitstream; and a transmitter coupled to the processor, the transmitter configured to transmit the video bitstream toward a video decoder.

The encoding device provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same TRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the preceding IRAP picture precedes the CRA picture in the output order or the decoding order.

Optionally, in any of the preceding aspects, another implementation of the aspect provides that the preceding IRAP picture precedes the CRA picture in the output order or the decoding order, the CRA picture is encoded using intra prediction, and one or more pictures following the CRA picture in the decoding order are encoded using inter prediction.

Optionally, in any of the preceding aspects, another implementation of the aspect provides that the memory stores the video bitstream prior to the transmitter transmitting the bitstream toward the video decoder.

A fifth aspect relates to a method of decoding implemented by a video decoder. The method includes receiving, by the video decoder, a coded video bitstream including a current picture; deriving, by the video decoder, a first reference picture list and a second reference picture list for each slice of the current picture; determining, by the video decoder, that the current picture is a trailing picture that follows, in both decoding order and output order, one or more leading pictures associated with a same intra random access point (TRAP) picture, the trailing picture signifying that there shall be no picture referred to by an entry in the first reference picture list or the second reference picture list that was generated by a decoding process for generating unavailable reference pictures for the TRAP picture associated with the current picture; and decoding, by the video decoder, each slice of the trailing picture based on one or both of the first reference picture list and the second reference picture list.

Optionally, in any of the preceding aspects, another implementation of the aspect provides that the decoding process for generating unavailable reference pictures is invoked once per coded picture for a clean random access (CRA) picture with a NoOutPutBeforeRecoveryFlag equal to one or a gradual decoding refresh (GDR) picture with the NoOutPutBeforeRecoveryFlag equal to one.

Optionally, in any of the preceding aspects, another implementation of the aspect provides that the same IRAP picture starts a coded video sequence (CVS) that contains the trailing picture and the one or more leading pictures.

Optionally, in any of the preceding aspects, another implementation of the aspect provides that the same IRAP picture is decoded using intra prediction, and wherein the trailing picture and the one or more leading pictures are decoded using inter prediction.

A sixth aspect relates to a method of encoding implemented by a video encoder. The method includes deriving, by the video encoder, a first reference picture list and a second reference picture list when a current picture is a trailing picture that follows, in both decoding order and output order, one or more leading pictures associated with a same intra random access point (IRAP) picture, wherein there shall be no picture referred to by an entry in the first reference picture list or the second reference picture list that was generated by a decoding process for generating unavailable reference pictures for the IRAP picture associated with the current picture; encoding, by the video encoder, the trailing picture and one or both of the first reference picture list and the second reference picture list into the video bitstream; and storing, by the video encoder, the video bitstream pending transmission toward a video decoder.

The method provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the decoding process for generating unavailable reference pictures is invoked once per coded picture for a clean random access (CRA) picture with a NoOutPutBeforeRecoveryFlag equal to one or a gradual decoding refresh (GDR) picture with the NoOutPutBeforeRecoveryFlag equal to one.

Optionally, in any of the preceding aspects, another implementation of the aspect provides that the same IRAP picture starts a coded video sequence (CVS) that contains the trailing picture and the one or more leading pictures.

Optionally, in any of the preceding aspects, another implementation of the aspect provides that the same IRAP picture is encoded into the video bitstream using intra prediction, and wherein the trailing picture and the one or more leading pictures are encoded using inter prediction.

Optionally, in any of the preceding aspects, another implementation of the aspect provides transmitting the video bitstream toward the video decoder.

A seventh aspect relates to a decoding device. The decoding device includes a receiver configured to receive a coded video bitstream including a current picture; a memory coupled to the receiver, the memory storing instructions; and a processor coupled to the memory, the processor configured to execute the instructions to cause the decoding device to: derive a first reference picture list and a second reference picture list for each slice of the current picture; determine that the current picture is a trailing picture that follows, in both decoding order and output order, one or more leading pictures associated with a same intra random access point (TRAP) picture, the trailing picture signifying that there shall be no picture referred to by an entry in the first reference picture list or the second reference picture list that was generated by a decoding process for generating unavailable reference pictures for the IRAP picture associated with the current picture; and decode each slice of the trailing picture based on one or both of the first reference picture list and the second reference picture list.

The decoding device provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same TRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the decoding process for generating unavailable reference pictures is invoked once per coded picture for a clean random access (CRA) picture with a NoOutPutBeforeRecoveryFlag equal to one or a gradual decoding refresh (GDR) picture with the NoOutPutBeforeRecoveryFlag equal to one.

Optionally, in any of the preceding aspects, another implementation of the aspect provides that the same IRAP picture starts a coded video sequence (CVS) that contains the trailing picture and the one or more leading pictures.

Optionally, in any of the preceding aspects, another implementation of the aspect provides that the same IRAP picture is decoded using intra prediction, and wherein the trailing picture and the one or more leading pictures are decoded using inter prediction.

An eighth aspect relates to an encoding device. The encoding device includes a memory containing instructions; a processor coupled to the memory, the processor configured to implement the instructions to cause the encoding device to: derive a first reference picture list and a second reference picture list when a current picture is a trailing picture that follows, in both decoding order and output order, one or more leading pictures associated with a same intra random access point (TRAP) picture, wherein there shall be no picture referred to by an entry in the first reference picture list or the second reference picture list that was generated by a decoding process for generating unavailable reference pictures for the TRAP picture associated with the current picture; encode the trailing picture and one or both of the first reference picture list and the second reference picture list into a video bitstream; and a transmitter coupled to the processor, the transmitter configured to transmit the video bitstream toward a video decoder.

Optionally, in any of the preceding aspects, another implementation of the aspect provides that the decoding process for generating unavailable reference pictures is invoked once per coded picture for a clean random access (CRA) picture with a NoOutPutBeforeRecoveryFlag equal to one or a gradual decoding refresh (GDR) picture with the NoOutPutBeforeRecoveryFlag equal to one.

Optionally, in any of the preceding aspects, another implementation of the aspect provides that the same IRAP picture starts a coded video sequence (CVS) that contains the trailing picture and the one or more leading pictures.

Optionally, in any of the preceding aspects, another implementation of the aspect provides that the same IRAP picture is encoded into the video bitstream using intra prediction, and wherein the trailing picture and the one or more leading pictures are encoded using inter prediction.

Optionally, in any of the preceding aspects, another implementation of the aspect provides that the memory stores the video bitstream prior to the transmitter transmitting the bitstream toward the video decoder.

A ninth aspect relates to a method of decoding implemented by a video decoder. The method includes receiving, by the video decoder, a coded video bitstream including a current picture; deriving, by the video decoder, a first reference picture list and a second reference picture list for each slice of the current picture; determining, by the video decoder, that the current picture is a trailing picture that follows, in both decoding order and output order, one or more leading pictures associated with a same intra random access point (TRAP) picture, the trailing picture signifying that there shall be no picture referred to by an entry in the first reference picture list or the second reference picture list that precedes the same TRAP picture in the output order or the decoding order; and decoding, by the video decoder, each slice of the trailing picture based on one or both of the first reference picture list and the second reference picture list.

The method of decoding provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same TRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the same TRAP picture starts a coded video sequence (CVS) that contains the trailing picture and the one or more leading pictures.

Optionally, in any of the preceding aspects, another implementation of the aspect provides that the same IRAP picture is decoded using intra prediction, and wherein the trailing picture and the one or more leading pictures are decoded using inter prediction.

A tenth aspect relates to a method of encoding implemented by a video encoder. The method includes deriving, by the video encoder, a first reference picture list and a second reference picture list when a current picture is a trailing picture that follows, in both decoding order and output order, one or more leading pictures associated with a same intra random access point (IRAP) picture, wherein there shall be no picture referred to by an entry in the first reference picture list or the second reference picture list that precedes the same TRAP picture in the output order or the decoding order; encoding, by the video encoder, the trailing picture and one or both of the first reference picture list and the second reference picture list into the video bitstream; and storing, by the video encoder, the video bitstream pending transmission toward a video decoder.

The method of encoding provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same TRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the same IRAP picture starts a coded video sequence (CVS) that contains the trailing picture and the one or more leading pictures.

Optionally, in any of the preceding aspects, another implementation of the aspect provides that the same IRAP picture is encoded into the video bitstream using intra prediction, and wherein the trailing picture and the one or more leading pictures are encoded using inter prediction.

Optionally, in any of the preceding aspects, another implementation of the aspect provides transmitting the video bitstream toward the video decoder.

An eleventh aspect relates to a decoding device. The decoding device includes a receiver configured to receive a coded video bitstream including a current picture; a memory coupled to the receiver, the memory storing instructions; and a processor coupled to the memory, the processor configured to execute the instructions to cause the decoding device to: derive a first reference picture list and a second reference picture list for each slice of the current picture; determine that the current picture is a trailing picture that follows, in both decoding order and output order, one or more leading pictures associated with a same intra random access point (TRAP) picture, the trailing picture signifying that there shall be no picture referred to by an entry in the first reference picture list or the second reference picture list that precedes the same IRAP picture in the output order or the decoding order; and decode each slice of the trailing picture based on one or both of the first reference picture list and the second reference picture list.

The decoding device provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same TRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the same IRAP picture starts a coded video sequence (CVS) that contains the trailing picture and the one or more leading pictures.

Optionally, in any of the preceding aspects, another implementation of the aspect provides that the same IRAP picture is decoded using intra prediction, and wherein the trailing picture and the one or more leading pictures are decoded using inter prediction.

A twelfth aspect relates to an encoding device. The encoding device includes a memory containing instructions; a processor coupled to the memory, the processor configured to implement the instructions to cause the encoding device to: derive a first reference picture list and a second reference picture list when a current picture is a trailing picture that follows, in both decoding order and output order, one or more leading pictures associated with a same intra random access point (TRAP) picture, wherein there shall be no picture referred to by an entry in the first reference picture list or the second reference picture list that precedes the same TRAP picture in the output order or the decoding order; and encode the trailing picture and one or both of the first reference picture list and the second reference picture list into a video bitstream; and a transmitter coupled to the processor, the transmitter configured to transmit the video bitstream toward a video decoder.

The encoding device provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same TRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the same IRAP picture starts a coded video sequence (CVS) that contains the trailing picture and the one or more leading pictures.

Optionally, in any of the preceding aspects, another implementation of the aspect provides that the same IRAP picture is encoded into the video bitstream using intra prediction, and wherein the trailing picture and the one or more leading pictures are encoded using inter prediction.

Optionally, in any of the preceding aspects, another implementation of the aspect provides that the memory stores the video bitstream prior to the transmitter transmitting the bitstream toward the video decoder.

A thirteenth aspect relates to a method of decoding. The method includes receiving, by the video decoder, a coded video bitstream including a current picture; deriving, by the video decoder, a first reference picture list and a second reference picture list for each slice of the current picture; determining, by the video decoder, that the current picture is a random access decodable leading (RADL) picture, the RADL picture signifying that there shall be no active entry in the first reference picture list or the second reference picture list that is any of the following: a random access skipped leading (RASL) picture; a picture generated by a decoding process for generating unavailable reference pictures; and a picture that precedes an associated intra random access point (TRAP) picture in decoding order; and decoding, by the video decoder, each slice of the RADL picture based on one or both of the first reference picture list and the second reference picture list.

The method provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the decoding process for generating unavailable reference pictures is invoked once per coded picture for a clean random access (CRA) picture with a NoOutPutBeforeRecoveryFlag equal to one or a gradual decoding refresh (GDR) picture with the NoOutPutBeforeRecoveryFlag equal to one.

A fourteenth aspect relates to a method of encoding. The method includes deriving, by the video encoder, a first reference picture list and a second reference picture list when a current picture is a random access decodable leading (RADL) picture, wherein there shall be no active entry in the first reference picture list or the second reference picture list that is any of the following: a random access skipped leading (RASL) picture; a picture generated by a decoding process for generating unavailable reference pictures; and a picture that precedes an associated intra random access point (TRAP) picture in decoding order; and encoding, by the video encoder, the RADL picture and one or both of the first reference picture list and the second reference picture list into a video bitstream; and storing, by the video encoder, the video bitstream pending transmission toward a video decoder.

The method of encoding provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same TRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the decoding process for generating unavailable reference pictures is invoked once per coded picture for a clean random access (CRA) picture with a NoOutPutBeforeRecoveryFlag equal to one or a gradual decoding refresh (GDR) picture with the NoOutPutBeforeRecoveryFlag equal to one.

A fifteenth aspect relates to a decoding device. The decoding device includes a receiver configured to receive a coded video bitstream including a current picture; a memory coupled to the receiver, the memory storing instructions; and a processor coupled to the memory, the processor configured to execute the instructions to cause the decoding device to: derive a first reference picture list and a second reference picture list for each slice of the current picture; determine that the current picture is a random access decodable leading (RADL) picture, the RADL picture signifying that there shall be no active entry in the first reference picture list or the second reference picture list that is any of the following: a random access skipped leading (RASL) picture; a picture generated by a decoding process for generating unavailable reference pictures; and a picture that precedes an associated intra random access point (IRAP) picture in decoding order; and decode each slice of the RADL picture based on one or both of the first reference picture list and the second reference picture list.

The decoding device provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the decoding process for generating unavailable reference pictures is invoked once per coded picture for a clean random access (CRA) picture with a NoOutPutBeforeRecoveryFlag equal to one or a gradual decoding refresh (GDR) picture with the NoOutPutBeforeRecoveryFlag equal to one.

A sixteenth aspect relates to an encoding device. The encoding device includes a memory containing instructions; a processor coupled to the memory, the processor configured to implement the instructions to cause the encoding device to: derive a first reference picture list and a second reference picture list when a current picture is a random access decodable leading (RADL) picture, wherein there shall be no active entry in the first reference picture list or the second reference picture list that is any of the following: a random access skipped leading (RASL) picture; a picture generated by a decoding process for generating unavailable reference pictures; and a picture that precedes an associated intra random access point (IRAP) picture in decoding order; and encode the RADL picture and one or both of the first reference picture list and the second reference picture list into a video bitstream; and a transmitter coupled to the processor, the transmitter configured to transmit the video bitstream toward a video decoder.

The encoding device provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same TRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the decoding process for generating unavailable reference pictures is invoked once per coded picture for a clean random access (CRA) picture with a NoOutPutBeforeRecoveryFlag equal to one or a gradual decoding refresh (GDR) picture with the NoOutPutBeforeRecoveryFlag equal to one.

A seventeenth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein The coding apparatus provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

An eighteenth aspect relates to a system. The system includes an encoder; and a decoder in communication with the encoder, wherein the encoder or the decoder includes the decoding device, the encoding device, or the coding apparatus disclosed herein.

The system provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

A nineteenth aspect relates to a means for coding. The means for coding includes receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 20 is an embodiment of a method of encoding.

DETAILED DESCRIPTION

Figure 1:
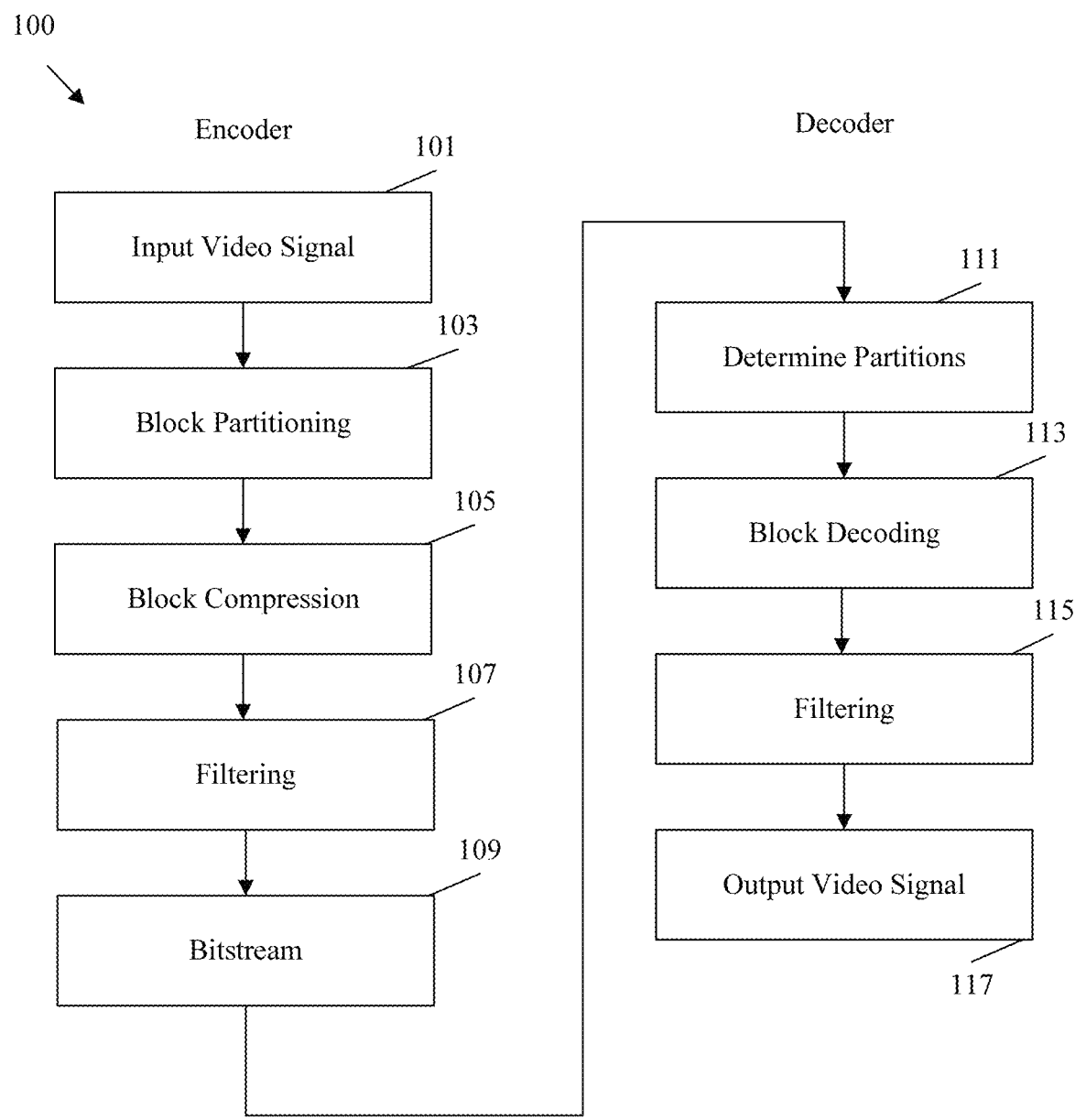
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion. A reference picture is a picture that contains reference samples that can be used when coding other pictures by reference according to inter-prediction and/or inter-layer prediction. A reference picture list is a list of reference pictures used for inter-prediction and/or inter-layer prediction. Some video coding systems use two reference picture lists, which can be denoted as reference picture list one and reference picture list zero. A reference picture list structure is an addressable syntax structure that contains multiple reference picture lists. Inter-prediction is a mechanism of coding samples of a current picture by reference to indicated samples in a reference picture that is different from the current picture where the reference picture and the current picture are in the same layer. A reference picture list structure entry is an addressable location in a reference picture list structure that indicates a reference picture associated with a reference picture list. A slice header is a part of a coded slice containing data elements pertaining to all video data within a tile represented in the slice. A sequence parameter set (SPS) is a parameter set that contains data related to a sequence of pictures. An access unit (AU) is a set of one or more coded pictures associated with the same display time (e.g., the same picture order count) for output from a decoded picture buffer (DPB) (e.g., for display to a user). A decoded video sequence is a sequence of pictures that have been reconstructed by a decoder in preparation for display to a user.

In each of the two reference picture lists for bidirectional inter prediction, reference pictures that may be used for inter prediction of the current picture can only be referred to by a number of entries at the beginning of the list. These entries are referred to as the active entries in the list, while other entries are referred to as the inactive entries in the list. The number of the total entries and the number of the active entries in the list can both be derived. The picture referred to by an inactive entry in a reference picture list is disallowed to be referred to by another entry in the reference picture list or any entry in the other reference picture list.

The following acronyms are used herein, Coded Video Sequence (CVS), Decoded Picture Buffer (DPB), Instantaneous Decoding Refresh (IDR), Intra Random Access Point (IRAP), Joint Video Experts Team (JVET), Least Significant Bit (LSB), Most Significant Bit (MSB), Network Abstraction Layer (NAL), Picture Order Count (POC), Raw Byte Sequence Payload (RBSP), Real-time Transport Protocol (RTP), Sequence Parameter Set (SPS), Versatile Video Coding (VVC), Working Draft (WD), Wavefront Parallel Processing (WPP).

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
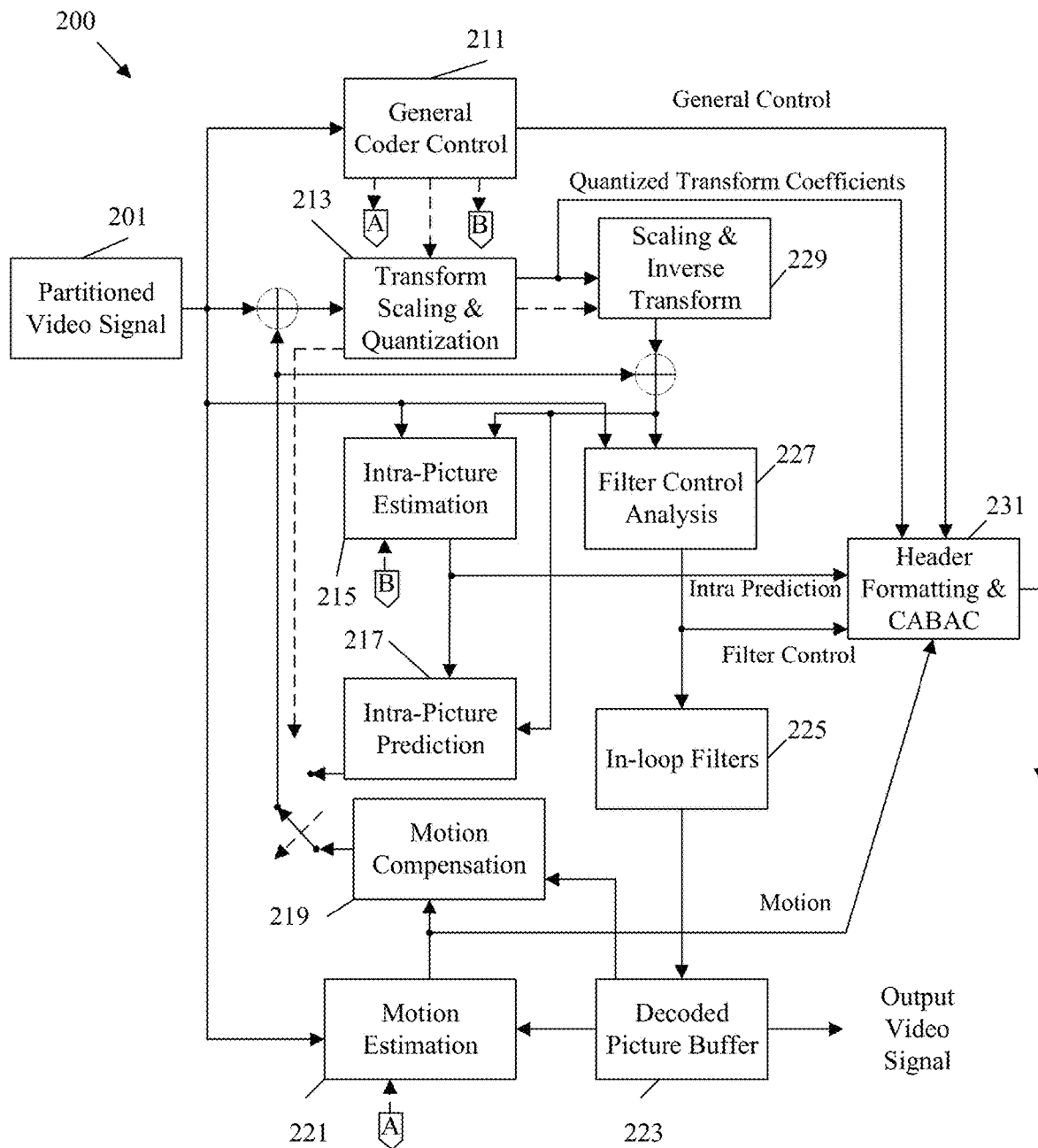
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
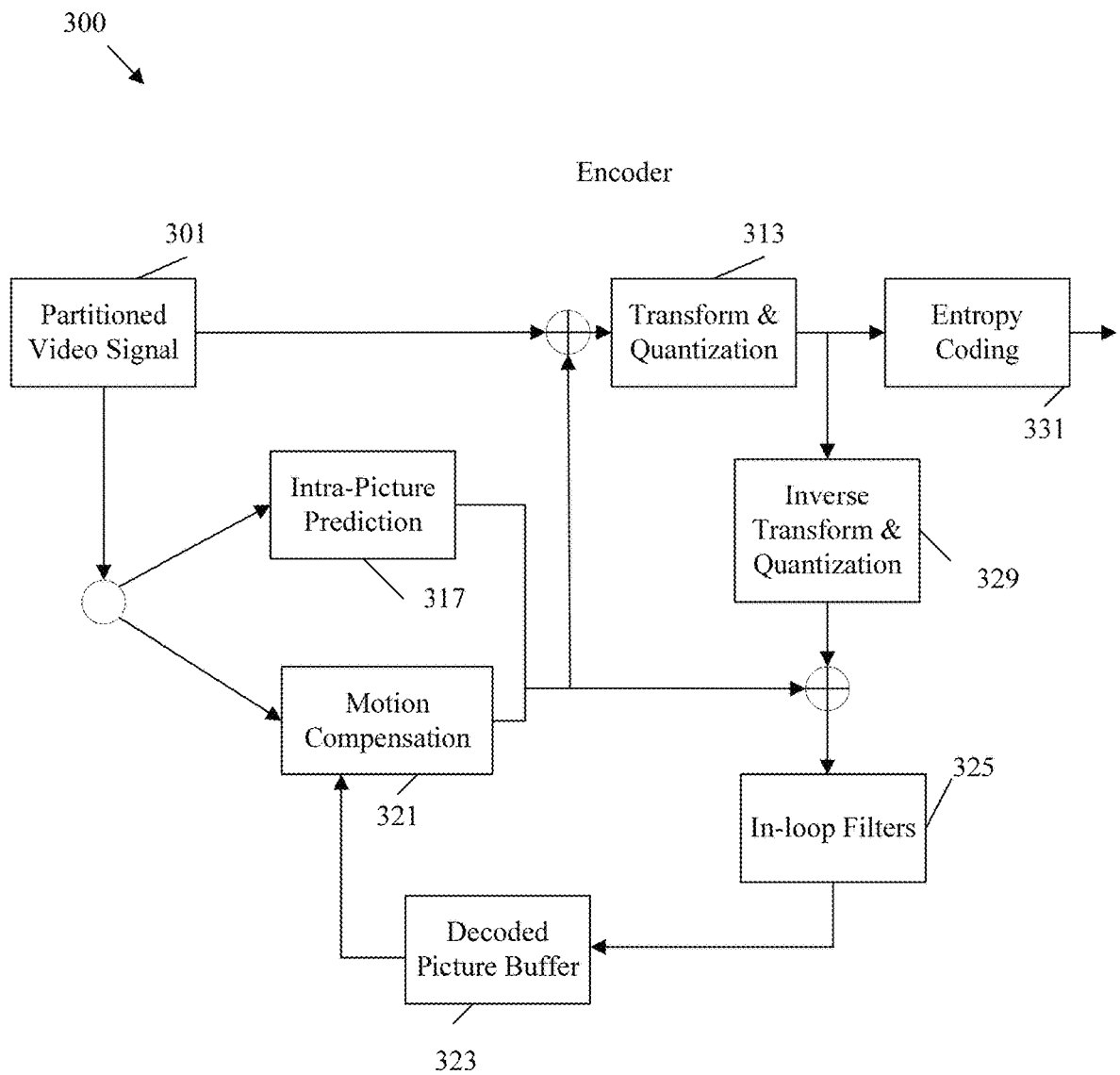
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
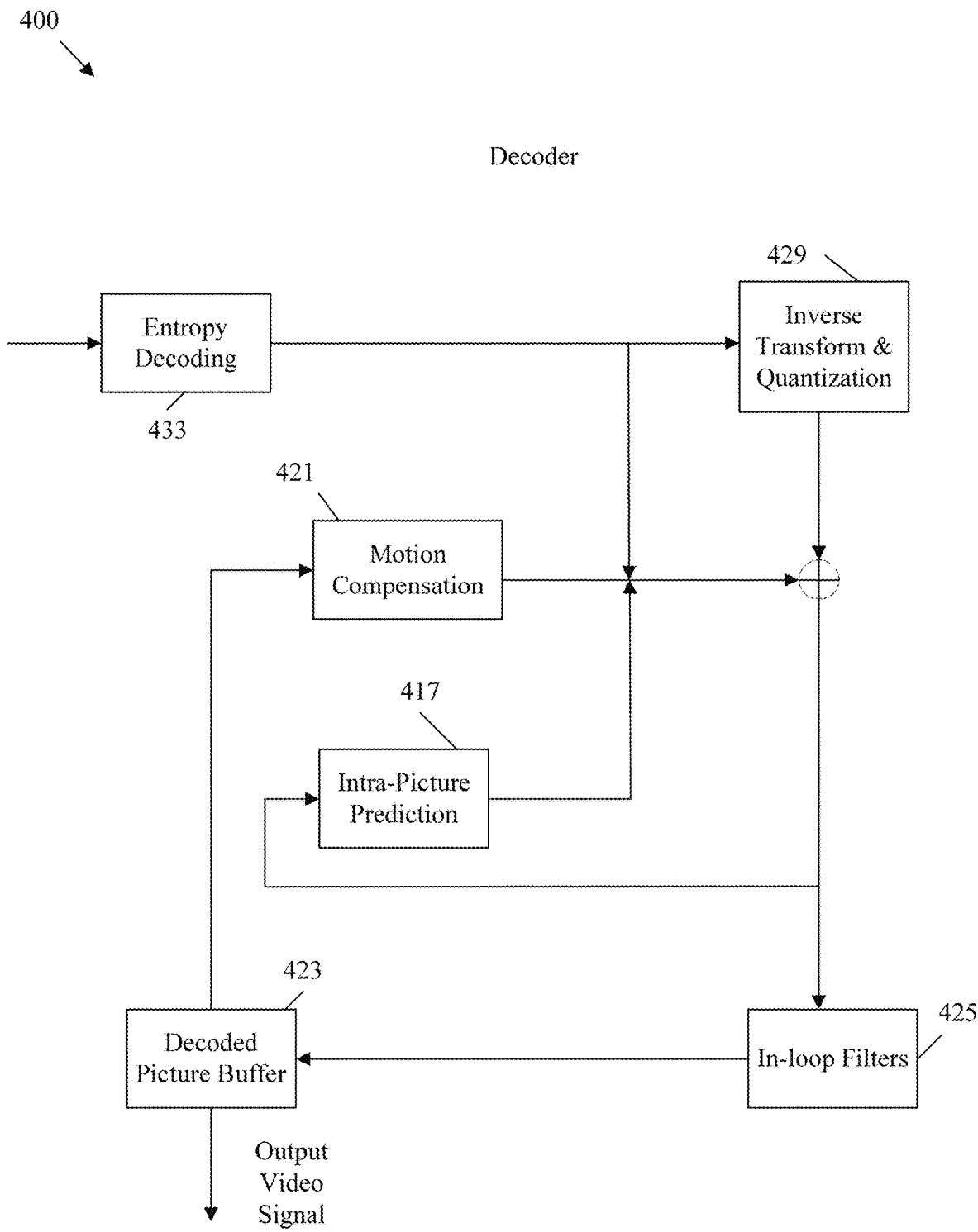
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Keeping the above in mind, video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Image and video compression has experienced rapid growth, leading to various coding standards. Such video coding standards include ITU-T H.261, International Organization for Standardization/International Electrotechnical Commission (ISO/IEC) MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (JVET) of ITU-T and ISO/IEC. While the VVC standard has several working drafts, one Working Draft (WD) of VVC in particular, namely B. Bross, J. Chen, and S. Liu, "Versatile Video Coding (Draft 5)," JVET-N1001-v3, 13th JVET Meeting, Mar. 27, 2019 (VVC Draft 5) is referenced herein.

The description of the techniques disclosed herein are based on the under-development video coding standard Versatile Video Coding (VVC) by the joint video experts team (JVET) of ITU-T and ISO/IEC. However, the techniques also apply to other video codec specifications.

Reference picture management in video coding is discussed for AVC, HEVC, and VVC.

In a video codec specification, pictures need to be identified for multiple purposes, including for use as a reference picture in inter prediction, for output of pictures from the decoded picture buffer (DPB), for scaling of motion vectors, for weighted prediction, etc.

In AVC and HEVC, pictures can be identified by picture order count (POC).

In AVC and HEVC, pictures in the DPB can be marked as "used for short-term reference", "used for long-term reference", or "unused for reference". Once a picture has been marked "unused for reference" it can no longer be used for prediction, and when it is no longer needed for output it can be removed from the DPB.

In AVC, there are two types of reference pictures, short-term and long-term. A reference picture may be marked as "unused for reference" when it becomes no longer needed for prediction reference. The conversion among these three statuses (short-term, long-term, and unused for reference) is controlled by the decoded reference picture marking process. There are two alternative decoded reference picture marking mechanisms, the implicit sliding window process and the explicit memory management control operation (MMCO) process. The sliding window process marks a short-term reference picture as "unused for reference" when the number of reference frames is equal to a given maximum number (max_num_ref_frames in the SPS). The short-term reference pictures are stored in a first-in, first-out manner so that the most recently decoded short-term pictures are kept in the DPB.

The explicit MMCO process may include multiple MMCO commands. An MMCO command may mark one or more short-term or long-term reference pictures as "unused for reference", mark all the pictures as "unused for reference", or mark the current reference picture or an existing short-term reference picture as long-term, and assign a long-term picture index to that long-term reference picture.

In AVC the reference picture marking operations as well as the processes for output and removal of pictures from the DPB are performed after a picture has been decoded.

HEVC introduces a different approach for reference picture management, referred to as reference picture set (RPS). The most fundamental difference with the RPS concept compared to MMCO/sliding window of AVC is that for each particular slice a complete set of the reference pictures that are used by the current picture or any subsequent picture is provided. Thus, a complete set of all pictures that must be kept in the DPB for use by the current or future picture is signaled. This is different from the AVC scheme where only relative changes to the DPB are signaled. With the RPS concept, no information from earlier pictures in decoding order is needed to maintain the correct status of reference pictures in the DPB.

The order of picture decoding and DPB operations in HEVC is changed compared to AVC in order to exploit the advantages of RPS and improve error resilience. In AVC picture marking and buffer operations (both output and removal of decoded pictures from the DPB) are generally applied after a current picture has been decoded. In HEVC, the RPS is first decoded from a slice header of the current picture, then picture marking and buffer operations are generally applied before decoding the current picture.

The latest VVC WD includes an approach for reference picture management based on two reference picture lists, reference picture list 0 and reference picture list 1. With that approach, reference picture lists for a picture are directly constructed without using a reference picture list initialization process and a reference picture list modification process. Furthermore, reference picture marking is directly based on the two reference picture lists.

The reference picture management related syntax and semantics in VVC are as follows.

The sequence parameter set RBSP is as follows.

| | Descriptor |
|---|---|
| seq_parameter_set_rbsp( ) { | |
| ... | |
| log2_max_pic_order_cnt_lsb_minus4 | ue(v) |
| sps_max_dec_pic_buffering_minus1 | ue(v) |
| long_term_ref_pics_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| ... | |

The picture parameter set RBSP is as follows.

| | Descriptor |
|---|---|
| pic_parameter_set_rbsp( ) { | |
| ... | |
| for( i = 0; i < 2; i++ ) | |
|   num_ref_idx_default_active_minus1[ i ] | ue(v) |
| rpl1_idx_present_flag | u(1) |
| ... | |

The general slice header syntax is as follows.

| | Descriptor |
|---|---|
| slice_header( ) { | |
| ... | |
| slice_pic_order_cnt_lsb | u(v) |
| if( ( NalUnitType != IDR_W_RADL && NalUnitType != IDR_N_LP ) | |
|   || sps_idr_rpl_present_flag ) { | |
|   for( i = 0; i < 2; i++ ) { | |
|     if( num_ref_pic_lists_in_sps[ i ] > 0 && | |
|       ( i = 0 || ( i = 1 && rpl1_idx_present_flag ) ) ) | |
|     ref_pic_list_sps_flag[ i ] | u(1) |
|   if( ref_pic_list_sps_flag[ i ] ) { | |
|     if( num_ref_pic_lists_in_sps[ i ] > 1 && | |
|       ( i == 0 || ( i == 1 && rpl1_idx_present_flag ) ) ) | |
|     ref_pic_list_idx | u(v) |
|   } else | |
|     ref_pic_list_struct( i, num_ref_pic_lists_in_sps[ i ] ) | |
|   for( j = 0; j < NumLtrpEntries[ i ][ RplsIdx[ i ] ]; j++ ) { | |
|     if( ltrp_in_slice_header_flag[ i ][ RplsIdx[ i ] ] ) | |
|       slice_poc_lsb_lt[ i ][ j ] | u(v) |
|     delta_poc_msb_present_flag[ i ][ j ] | u(1) |
|     if( delta_poc_msb_present_flag[ i ][ j ] ) | |
|       delta_poc_msb_cycle_lt[ i ][ j ] | ue(v) |
|   } | |
| } | |
| if( ( slice_type != I && num_ref_entries[ 0 ] [ RplsIdx[ 0 ] ] > 1) || | |
|   ( slice_type == B && num_ref_entries [ 1 ][ RplsIdx[ 1 ] ] > 1 ) ) { | |
|   num_ref_idx_active_override_flag | u(1) |
|   if( num_ref_idx_active_override_flag ) | |

-continued

| | Descriptor |
|---|---|
| `    for( i = 0; i < ( slice_type = = B ? 2: 1); i++ )` | |
| `        if( num_ref_entries[ i ][ RplsIdx[ i ] ] > 1 )` | |
| `            num_ref_idx_active_minus1[ i ]` | ue(v) |
| `  }` | |
| `}` | |
| ... | |

The reference picture list syntax is as follows.

| | Descriptor |
|---|---|
| `ref_pic_list_struct( listIdx, rplsIdx ) {` | |
| `    num_ref_entries[ listIdx ][ rplsIdx ]` | ue(v) |
| `    if( long_term_ref_pics_flag )` | |
| `        ltrp_in_slice_header_flag[ listIdx ][ rplsIdx ]` | u(1) |
| `    for( i = 0, j = 0; i < num_ref entries[ listIdx ][ rplsIdx ]; i++) {` | |
| `        if( long_term_ref_pics_flag )` | |
| `            st_ref_pic_flag[ listIdx ][ rplsIdx ][ i ]` | u(1) |
| `        if( st_ref_pic_flag[ listIdx ][ rplsIdx ][ i ] ) 1` | |
| `            abs_delta_poc_st[ listIdx ][ rplsIdx ][ i ]` | ue(v) |
| `            if( abs_delta_poc_st[ listIdx ][ rplsIdx ][ i ] > 0)` | |
| `                strp_entry_sign_flag[ listIdx ][ rplsIdx ][ i ]` | u(1) |
| `        } else if( !ltrp_in_slice_header_flag[ listIdx ][ rplsIdx ] )` | |
| `            rpls_poc_lsb_lt[ listIdx ][ rplsIdx ][ j++ ]` | u(v) |
| `    }` | |
| `}` | |

The sequence parameter set RBSP semantics are as follows.

log2_max_pic_order_cnt_lsb_minus4 specifies the value of the variable MaxPicOrderCntLsb that is used in the decoding process for picture order count as follows.

$$\text{MaxPicOrderCntLsb} = 2^{(log2\_max\_pic\_order\_cnt\_lsb\_minus4+4)} \quad (7\text{-}7)$$

The value of log2_max_pic_order_cnt_lsb_minus4 shall be in the range of 0 to 12, inclusive.

sps_max_dec_pic_buffering_minus1 plus 1 specifies the maximum required size of the decoded picture buffer for the CVS in units of picture storage buffers. The value of sps_max_dec_pic_buffering_minus1 shall be in the range of 0 to MaxDpbSize−1, inclusive, where MaxDpbSize is as specified somewhere else.

long_term_ref_pics_flag equal to 0 specifies that no long-term reference picture (LTRP) is used for inter prediction of any coded picture in the CVS. long_term_ref_pics_flag equal to 1 specifies that LTRPs may be used for inter prediction of one or more coded pictures in the CVS.

sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures.

rpl1_same_as_rpl0_flag equal to 1 specifies that the syntax structures num_ref_pic_lists_in_sps[1] and ref_pic_list_struct(1, rplsIdx) are not present and the following applies:

The value of num_ref_pic_lists_in_sps[1] is inferred to be equal to the value of num_ref_pic_lists_in_sps[0].

The value of each of syntax elements in ref_pic_list_struct(1, rplsIdx) is inferred to be equal to the value of corresponding syntax element in ref_pic_list_struct(0, rplsIdx) for rplsIdx ranging from 0 to num_ref_pic_lists_in_sps[0]−1.

num_ref_pic_lists_in_sps[i] specifies the number of the ref_pic_list_struct(listIdx, rplsIdx) syntax structures with listIdx equal to i included in the SPS. The value of num_ref_pic_lists_in_sps[i] shall be in the range of 0 to 64, inclusive.

NOTE 3—For each value of listIdx (equal to 0 or 1), a decoder should allocate memory for a total number of num_ref_pic_lists_in_sps[i]+1 ref_pic_list_struct(listIdx, rplsIdx) syntax structures since there may be one ref_pic_list_struct(listIdx, rplsIdx) syntax structure directly signalled in the slice headers of a current picture.

The picture parameter set RBSP semantics are as follows.

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

rpl1_idx_present_flag equal to 0 specifies that ref_pic_list_sps_flag[1] and ref_pic_list_idx[1] are not present in slice headers. rpl1_idx_present_flag equal to 1 specifies that ref_pic_list_sps_flag[1] and ref_pic_list_idx[1] may be present in slice headers.

The general slice header semantics are as follows.

slice_pic_order_cnt_lsb specifies the picture order count modulo MaxPicOrderCntLsb for the current picture. The length of the slice_pic_order_cnt_lsb syntax element is log2_max_pic_order_cnt_lsb_minus4+4 bits. The value of the slice_pic_order_cnt_lsb shall be in the range of 0 to MaxPicOrderCntLsb−1, inclusive.

ref_pic_list_sps_flag[i] equal to 1 specifies that reference picture list i of the current slice is derived based on one of the ref_pic_list_struct(listIdx, rplsIdx) syntax structures with listIdx equal to i in the active SPS. ref_pic_list_sps_flag[i] equal to 0 specifies that reference picture list i of the current slice is derived based on the ref_pic_list_struct(listIdx, rplsIdx) syntax structure with listIdx equal to i that is directly included in the slice headers of the current picture. When num_ref_pic_lists_insps[i] is equal to 0, the value of ref_pic_list_sps_flag[i] is inferred to be equal to 0. When rpl1_idx_present_flag is equal to 0, the value of ref_pic_list_sps_flag[1] is inferred to be equal to ref_pic_list_sps_flag[0].

ref_pic_list_idx[i] specifies the index, into the list of the ref_pic_list_struct(listIdx, rplsIdx) syntax structures with listIdx equal to i included in the active SPS, of the ref_pic_list_struct(listIdx, rplsIdx) syntax structure with listIdx equal to i that is used for derivation of reference picture list i of the current picture. The syntax element ref_pic_list_idx[i] is represented by Ceil(Log2(num_ref_pic_lists_insps[i])) bits. When not present, the value of ref_pic_list_idx[i] is inferred to be equal to 0. The value of ref_pic_list_idx[i] shall be in the range of 0 to num_ref_pic_lists_in_sps[i]−1, inclusive. When ref_pic_list_sps_flag[i] is equal to 1 and num_ref_pic_lists_in_sps[i] is equal to 1, the value of ref_pic_list_idx[i] is inferred to be equal to 0. When ref_pic_list_sps_flag[i] is equal to 1 and rpl1_idx_present_flag is equal to 0, the value of ref_pic_list_idx[1] is inferred to be equal to ref_pic_list_idx[0].

The variable RplsIdx[i] is derived as follows:

RplsIdx[$i$]=ref_pic_list_sps_flag[$i$]? ref_pic_list_idx
　　[$i$]: num_ref_pic_lists_in_sps[$i$]　　　　　　　　(7-40)

slice_poc_lsb_lt[i][j] specifies the value of the picture order count modulo MaxPicOrderCntLsb of the j-th LTRP entry in the i-th reference picture list. The length of the slice_poc_lsb_lt[i][j] syntax element is log2_max_pic_order_cnt_lsb_minus4+4 bits.

The variable PocLsbLt[i][j] is derived as follows.

PocLsbLt[$i$][$j$]=ltrp_in_slice_header_flag[$i$][RplsIdx
　　[$i$]]?slice_poc_lsb_lt[$i$][$j$]: rpls_poc_lsb_lt[lis-
　　tIdx][RplsIdx[$i$]][$j$]　　　　　　　　　　　　(7-41)

delta_poc_msb_present_flag[i][j] equal to 1 specifies that delta_poc_msb_cycle_lt[i][j] is present. delta_poc_msb_present_flag[i][j] equal to 0 specifies that delta_poc_msb_cycle_lt[i][j] is not present.

Let prevTid0Pic be the previous picture in decoding order that has TemporalId equal to 0 and is not a random access skipped leading (RASL) or random access decodable leading (RADL) picture. Let setOfPrevPocVals be a set consisting of the following:

the PicOrderCntVal of prevTid0Pic,
　the PicOrderCntVal of each picture referred to by entries in RefPicList[0] and entries in RefPicList[1] of prevTid0Pic,
　the PicOrderCntVal of each picture that follows prevTid0Pic in decoding order and precedes the current picture in decoding order.

When there is more than one value in setOfPrevPocVals for which the value modulo MaxPicOrderCntLsb is equal to PocLsbLt[i][j], the value of delta_poc_msb_present_flag[i][j] shall be equal to 1.

delta_poc_msb_cycle_lt[i][j] specifies the value of the variable FullPocLt[i][j] as follows:

```
if( j == 0 )
   deltaMsbCycle[ i ][ j ]  =  delta_poc_msb_cycle_lt[ i ][ j ]
else     (7-42)
   deltaMsbCycle[ i ][ j ]  =  delta_poc_msb_cycle_lt[ i ][ j ]  +
deltaMsbCycle[ i ][ j − 1 ]
   FullPocLt[ i ][ RplsIdx[ i ] ][ j ]  =  PicOrderCntVal −
deltaMsbCycle[ i ][ j ]  *
MaxPicOrderCntLsb − ( PicOrderCntVal & ( MaxPicOrderCntLsb −
1 ) ) + PocLsbLt[ i ][ j ]
```

The value of delta_poc_msb_cycle_lt[i][j] shall be in the range of 0 to $2^{(32-log2\_max\_pic\_order\_cnt\_lsb\_minus4-4)}$, inclusive. When not present, the value of delta_poc_msb_cycle_lt[i][j] is inferred to be equal to 0.

num_ref_idx_active_override_flag equal to 1 specifies that the syntax element num_ref_idx_active_minus1[0] is present for P and B slices and that the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present. When not present, the value of num_ref_idx_active_override_flag is inferred to be equal to 1.

num_ref_idx_active_minus1[i] is used for the derivation of the variable NumRefIdxActive[i] as specified by Equation 7-43. The value of num_ref_idx_active_minus1[i] shall be in the range of 0 to 14, inclusive.

For i equal to 0 or 1, when the current slice is a B slice, num_ref_idx_active_override_flag is equal to 1, and *num_ref_idx_active_minus1[i] is not present, num_ref_idx_active_minus1[i] is inferred to be equal to* 0.

When the current slice is a P slice, num_ref_idx_active_override_flag is equal to 1, and num_ref_idx_active_minus1[0] is not present, num_ref_idx_active_minus1[0] is inferred to be equal to 0.

The variable NumRefIdxActive[i] is derived as follows:

```
for( i = 0; i < 2; i++ ) {
   if( slice_type == B || ( slice_type == P && i == 0 ) ) {
      if( num_ref_idx_active_override_flag )
         NumRefIdxActive[ i ] = num_ref_idx_active_minus1[ i ] + 1(7-43)
      else {
         if(  num_ref_entries[ i ][ RplsIdx[ i ] ] >=
num_ref_idx_default_active_minus1[ i ] + 1 )
            NumRefIdxActive[ i ]  =
num_ref_idx_default_active_minus1[ i ] + 1
         else
            NumRefIdxActive[ i ] = num_ref_entries[ i ][ RplsIdx[ i ] ]
      }
   } else  // slice_type == I || ( slice_type == P && i == 1 )
      NumRefIdxActive[ i ] = 0
}
```

The value of NumRefIdxActive[i]−1 specifies the maximum reference index for reference picture list i that may be used to decode the slice. When the value of NumRefIdxActive[i] is equal to 0, no reference index for reference picture list i may be used to decode the slice.

The variable CurrPicIsOnlyRef, specifying that the current decoded picture is the only reference picture for the current slice, is derived as follows.

CurrPicIsOnlyRef=sps_cpr_enabled_flag &&
　　(slice_type==P) && (num_ref_idx_active_mi-
　　nus1[0]==0)　　　　　　　　　　　　　(7-44)

Reference picture list structure semantics are provided.

The ref_pic_list_struct(listIdx, rplsIdx) syntax structure may be present in an SPS or in a slice header. Depending on whether the syntax structure is included in a slice header or an SPS, the following applies.

If present in a slice header, the ref_pic_list_struct(listIdx, rplsIdx) syntax structure specifies reference picture list listIdx of the current picture (the picture containing the slice).

Otherwise (present in an SPS), the ref_pic_list_struct (listIdx, rplsIdx) syntax structure specifies a candidate for reference picture list listIdx, and the term "the current picture" in the semantics specified in the remainder of this clause refers to each picture that 1) has one or more slices containing ref_pic_list_idx[listIdx] equal to an index into the list of the ref_pic_list_struct(listIdx, rplsIdx) syntax structures included in the SPS, and 2) is in a CVS that has the SPS as the active SPS.

num_ref_entries[listIdx][rplsIdx] specifies the number of entries in the ref_pic_list_struct(listIdx, rplsIdx) syntax structure. The value of num_ref_entries[listIdx][rplsIdx] shall be in the range of 0 to sps_max_dec_pic_buffering_minus1+14, inclusive.

ltrp_in_slice_header_flag[listIdx][rplsIdx] equal to 0 specifies that the POC LSBs of the LTRP entries in the ref_pic_list_struct(listIdx, rplsIdx) syntax structure are present in the ref_pic_list_struct(listIdx, rplsIdx) syntax structure. ltrp_in_slice_header_flag[listIdx][rplsIdx] equal to 1 specifies that the POC LSBs of the LTRP entries in the ref_pic_list_struct(listIdx, rplsIdx) syntax structure are not present in the ref_pic_list_struct(listIdx, rplsIdx) syntax structure.

st_ref_pic_flag[listIdx][rplsIdx][i] equal to 1 specifies that the i-th entry in the ref_pic_list_struct(listIdx, rplsIdx) syntax structure is an secure real-time transport protocol (STRP) entry. st_ref_pic_flag[listIdx][rplsIdx][i] equal to 0 specifies that the i-th entry in the ref_pic_list_struct(listIdx, rplsIdx) syntax structure is an LTRP entry. When not present, the value of st_ref_pic_flag[listIdx][rplsIdx][i] is inferred to be equal to 1.

The variable NumLtrpEntries[listIdx][rplsIdx] is derived as follows:

```
for(i=0, NumLtrpEntries[listIdx][rplsIdx]=0;
    num_ref_entries[listIdx][rplsIdx]; i++)

if(!st_ref_pic_flag[listIdx][rplsIdx][i]) NumLtrpEn-
    tries[listIdx][rplsIdx]++                       (7-86)
``` abs_delta_poc_st[listIdx][rplsIdx][i], when the i-th entry is the first STRP entry in ref_pic_list_struct(listIdx, rplsIdx) syntax structure, specifies the absolute difference between the picture order count values of the current picture and the picture referred to by the i-th entry, or, when the i-th entry is an STRP entry but not the first STRP entry in the ref_pic_list_struct(listIdx, rplsIdx) syntax structure, specifies the absolute difference between the picture order count values of the pictures referred to by the i-th entry and by the previous STRP entry in the ref_pic_list_struct(listIdx, rplsIdx) syntax structure.

The value of abs_delta_poc_st[listIdx][rplsIdx][i] shall be in the range of 0 to $2^{15}-1$, inclusive.

strp_entry_sign_flag[listIdx][rplsIdx][i] equal to 1 specifies that i-th entry in the syntax structure ref_pic_list_struct (listIdx, rplsIdx) has a value greater than or equal to 0. strp_entry_sign_flag[listIdx][rplsIdx] equal to 0 specifies that the i-th entry in the syntax structure ref_pic_list_struct (listIdx, rplsIdx) has a value less than 0. When not present, the value of strp_entry_sign_flag[i][j] is inferred to be equal to 1.

The list DeltaPocSt[listIdx][rplsIdx] is derived as follows.

```
for( i = 0; i < num_ref_entries[ listIdx ][ rplsIdx ]; i++ ) {
    if( st_ref_pic_flag[ listIdx ][ rplsIdx ][ i ] ) { (7-87)
        DeltaPocSt[ listIdx ][ rplsIdx ][ i ]  =  (
strp_entry_sign_flag[ listIdx ][ rplsIdx ][ i ]) ?
            abs_delta_poc_st[ listIdx ][ rplsIdx ][ i ]  :  0 -
abs_delta_poc_st[ listIdx ][ rplsIdx ][ i ]
    }
}
``` rpls_poc_lsb_lt[listIdx][rplsIdx][i] specifies the value of the picture order count modulo MaxPicOrderCntLsb of the picture referred to by the i-th entry in the ref_pic_list_struct (listIdx, rplsIdx) syntax structure. The length of the rpls_poc_lsb_lt[listIdx][rplsIdx][i] syntax element is log2_max_pic_order_cnt_lsb_minus4+4 bits.

The problems of the existing solutions are discussed.

To ensure the reference picture lists only contain reference pictures that are allowed, bitstream conformance constraints need to be specified. For HEVC, the following constraints were specified for types of reference pictures that may be present in a reference picture set (RPS).

When the current picture is a CRA picture, there shall be no picture included in the RPS that precedes, in output order or decoding order, any preceding TRAP picture in decoding order (when present).

When the current picture is a trailing picture, there shall be no picture in RefPicSetStCurrBefore, RefPicSetStCurrAfter or RefPicSetLtCurr that was generated by the decoding process for generating unavailable reference pictures as specified in clause 8.3.3.

When the current picture is a trailing picture, there shall be no picture in the RPS that precedes the associated TRAP picture in output order or decoding order.

When the current picture is a RADL picture, there shall be no picture included in RefPicSetStCurrBefore, RefPicSetStCurrAfter or RefPicSetLtCurr that is any of the following:
 A RASL picture
 A picture that was generated by the decoding process for generating unavailable reference pictures as specified in clause 8.3.3
 A picture that precedes the associated TRAP picture in decoding order For the reference picture list (RPL) approach, the following issues are identified.

1. In general, the bitstream conformance constraints about types of reference pictures that may be present in the reference picture list are not specified.

2. When interlace coding is used, the two fields of an IRAP picture may not both be marked as IRAP picture, instead only the first field is marked as IRAP picture and the other field is marked as trailing picture. This consequently means the similar constraint above "when the current picture is a trailing picture, there shall be no picture in the RPS that precedes the associated IRAP picture in output order or decoding order" does not work for this situation. Modification to the constraint is needed.

Disclosed herein are techniques that constrain reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Thus, the coder/decoder (a.k.a., "codec") in video coding is improved relative to current codecs. As a practical matter, the improved video coding process offers the user a better user experience when videos are sent, received, and/or viewed.

Figure 5:
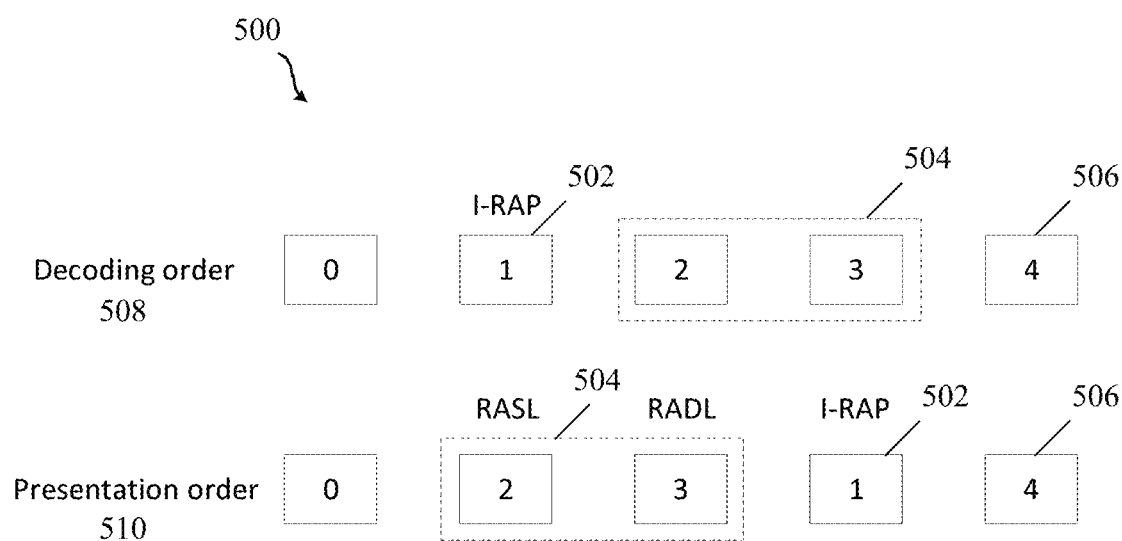
FIG. 5 is a coded video sequence depicting the relationship between an intra random access point (IRAP) picture relative to leading pictures and trailing pictures in a decoding order and a presentation order.

FIG. 5 is a coded video sequence 500 depicting the relationship between an intra random access point (IRAP) picture 502 relative to leading pictures 504 and trailing pictures 506 in a decoding order 508 and a presentation order 510 (a.k.a., an output order). In an embodiment, the IRAP picture 502 is referred to as a clean random access (CRA) picture or as an instantaneous decoder refresh (IDR) picture with random access decodable (RADL) picture. In HEVC, IDR pictures, CRA pictures, and Broken Link Access (BLA) pictures are all considered IRAP pictures 502. For VVC, during the 12th JVET meeting in October 2018, it was agreed to have both MR and CRA pictures as IRAP pictures. In an embodiment, Broken Link Access (BLA) and Gradual Decoder Refresh (GDR) pictures may also be considered to be IRAP pictures. The decoding process for a coded video sequence always starts at an IRAP picture.

A CRA picture is an IRAP picture for which each video coding layer (VCL) network abstraction layer (NAL) unit has nal_unit_type equal to CRA_NUT. A CRA picture does not refer to any pictures other than itself for inter prediction in its decoding process, and may be the first picture in the bitstream in decoding order, or may appear later in the bitstream. A CRA picture may have associated RADL or random access skipped leading (RASL) pictures. When a CRA picture has NoOutputBeforeRecoveryFlag equal to 1, the associated RASL pictures are not output by the decoder, because they may not be decodable, as they may contain references to pictures that are not present in the bitstream.

As shown in FIG. 5, the leading pictures 504 (e.g., pictures 2 and 3) follow the IRAP picture 502 in the decoding order 508, but precede the IRAP picture 502 in the presentation order 510. The trailing picture 506 follows the IRAP picture 502 in both the decoding order 508 and in the presentation order 510. While two leading pictures 504 and one trailing picture 506 are depicted in FIG. 5, those skilled in the art will appreciate that more or fewer leading pictures 504 and/or trailing pictures 506 may be present in the decoding order 508 and the presentation order 510 in practical applications.

The leading pictures 504 in FIG. 5 have been divided into two types, namely random access skipped leading (RASL) and RADL. When decoding starts with the IRAP picture 502 (e.g., picture 1), the RADL picture (e.g., picture 3) can be properly decoded; however, the RASL picture (e.g., picture 2) cannot be properly decoded. Thus, the RASL picture is discarded. In light of the distinction between RADL and RASL pictures, the type of leading picture 504 associated with the IRAP picture 502 should be identified as either RADL or RASL for efficient and proper coding. In HEVC, when RASL and RADL pictures are present, it is constrained that for RASL and RADL pictures that are associated with the same IRAP picture 502, the RASL pictures shall precede the RADL pictures in presentation order 510.

An IRAP picture 502 provides the following two important functionalities/benefits. Firstly, the presence of an IRAP picture 502 indicates that the decoding process can start from that picture. This functionality allows a random access feature in which the decoding process starts at that position in the bitstream, not necessarily the beginning of the bitstream, as long as an IRAP picture 502 is present at that position. Secondly, the presence of an IRAP picture 502 refreshes the decoding process such that a coded picture starting at the IRAP picture 502, excluding RASL pictures, are coded without any reference to previous pictures. Having an IRAP picture 502 present in the bitstream consequently would stop any error that may happen during decoding of coded pictures prior to the IRAP picture 502 to propagate to the IRAP picture 502 and those pictures that follow the IRAP picture 502 in decoding order 508.

While IRAP pictures 502 provide important functionalities, they come with a penalty to the compression efficiency. The presence of an IRAP picture 502 causes a surge in bitrate. This penalty to the compression efficiency is due to two reasons. Firstly, as an IRAP picture 502 is an intrapredicted picture, the picture itself would require relatively more bits to represent when compared to other pictures (e.g., leading pictures 504, trailing pictures 506) that are interpredicted pictures. Secondly, because the presence of an TRAP picture 502 breaks temporal prediction (this is because the decoder would refresh the decoding process, in which one of the actions of the decoding process for this is to remove previous reference pictures in the decoded picture buffer (DPB)), the IRAP picture 502 causes the coding of pictures that follow the TRAP picture 502 in decoding order 508 to be less efficient (i.e., needs more bits to represent) because they have less reference pictures for their interprediction coding.

Among the picture types that are considered TRAP pictures 502, the IDR picture in HEVC has different signaling and derivation when compared to other picture types. Some of the differences are as follows.

For signaling and derivation of a picture order count (POC) value of an IDR picture, the most significant bit (MSB) part of the POC is not derived from the previous key picture but simply set to be equal to 0.

For signaling information needed for reference picture management, the slice header of an IDR picture does not contain information needed to be signaled to assist reference picture management. For other picture types (i.e., CRA, Trailing, temporal sub-layer access (TSA), etc.), information such as the reference picture set (RPS) described below or other forms of similar information (e.g., reference picture lists) are needed for the reference pictures marking process (i.e., the process to determine the status of reference pictures in the decoded picture buffer (DPB), either used for reference or unused for reference). However, for the IDR picture, such information does not need to be signaled because the presence of IDR indicates that the decoding process shall simply mark all reference pictures in the DPB as unused for reference.

In HEVC and VVC, slices of TRAP pictures 502 and leading pictures 504 may each be contained within a single network abstraction layer (NAL) unit. A set of the NAL units may be referred to as an access unit. TRAP pictures 502 and leading pictures 504 are given different NAL unit types so that they can be easily identified by system level applications. For example, a video splicer needs to understand coded picture types without having to understand too much detail of the syntax element in the coded bitstream, particularly to identify IRAP pictures 502 from non-IRAP pictures and to identify leading pictures 504, including determining RASL and RADL pictures, from trailing pictures 506. Trailing pictures 506 are those pictures that are associated with an TRAP picture 502 and follow the IRAP picture 502 in presentation order 510. A picture may follow the particular TRAP picture 502 in decoding order 508 and precede any other TRAP picture 502 in decoding order 508. For this, giving TRAP pictures 502 and leading pictures 504 their own NAL unit type helps such applications.

For HEVC, NAL unit types for TRAP pictures include the following:

BLA with leading picture (BLA_W_LP): NAL unit of a Broken Link Access (BLA) picture that may be followed by one or more leading pictures in decoding order.

BLA with RADL (BLA_W_RADL): NAL unit of a BLA picture that may be followed by one or more RADL pictures but no RASL picture in decoding order.

BLA with no leading picture (BLA_N_LP): NAL unit of a BLA picture that is not followed by leading picture in decoding order.

IDR with RADL (IDR_W_RADL): NAL unit of an IDR picture that may be followed by one or more RADL pictures but no RASL picture in decoding order.

IDR with no leading picture (IDR_N_LP): NAL unit of an IDR picture that is not followed by leading picture in decoding order.

CRA: NAL unit of a Clean Random Access (CRA) picture that may be followed by leading pictures (i.e., either RASL pictures or RADL pictures or both).

RADL: NAL unit of a RADL picture.
RASL: NAL unit of a RASL picture.
For VVC, the NAL unit type for IRAP pictures 502 and leading pictures 504 are as follows:
IDR with RADL (IDR_W_RADL): NAL unit of an IDR picture that may be followed by one or more RADL pictures but no RASL picture in decoding order.
IDR with no leading picture (IDR_N_LP): NAL unit of an IDR picture that is not followed by leading picture in decoding order.
CRA: NAL unit of a Clean Random Access (CRA) picture that may be followed by leading pictures (i.e., either RASL pictures or RADL pictures or both).
RADL: NAL unit of a RADL picture.
RASL: NAL unit of a RASL picture.

Figure 6:
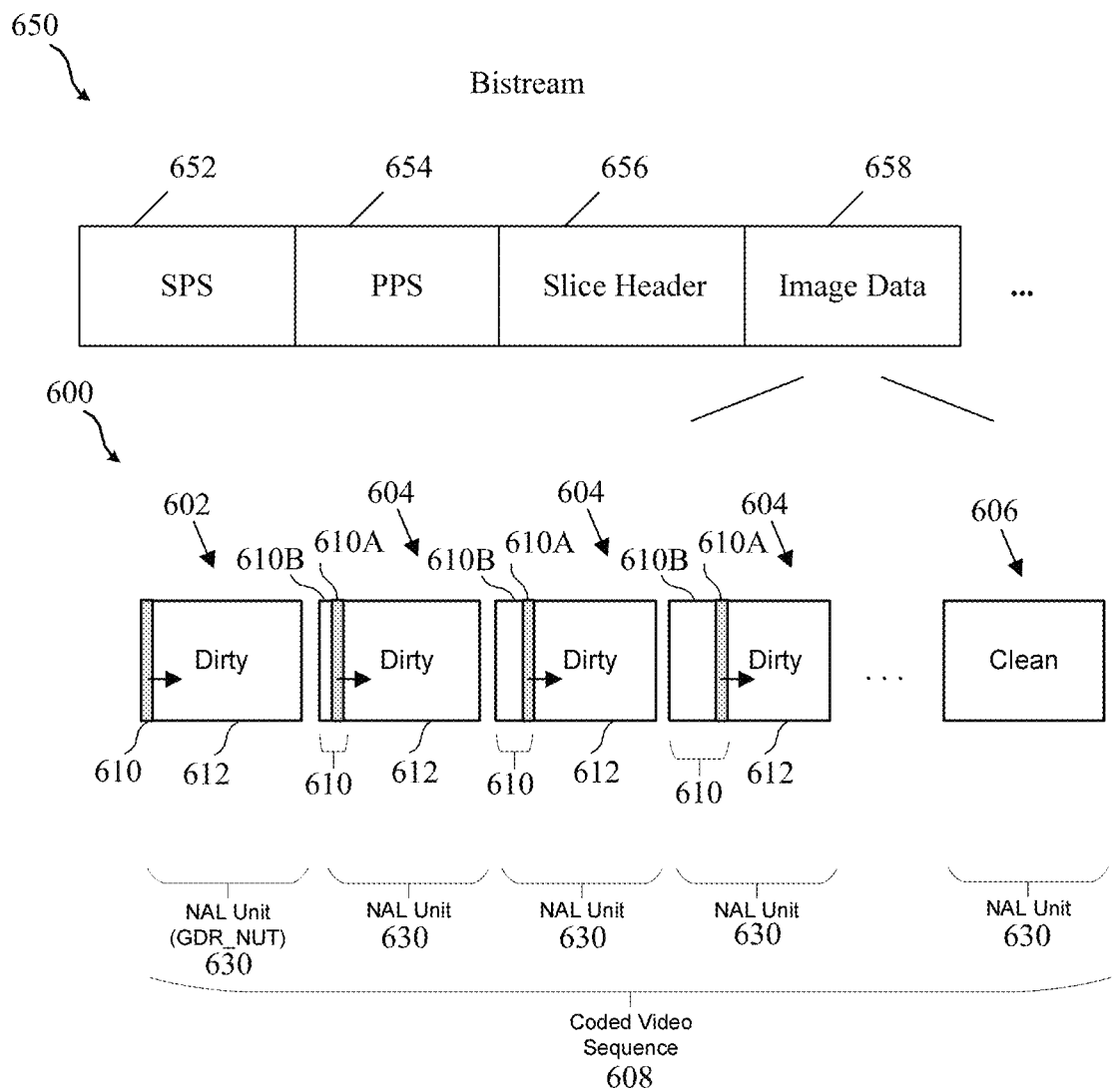
FIG. 6 illustrates a video bitstream configured to implement a gradual decoding refresh (GDR) technique.

FIG. 6 illustrates a video bitstream 650 configured to implement a gradual decoding refresh (GDR) technique 600. As used herein the video bitstream 650 may also be referred to as a coded video bitstream, a bitstream, or variations thereof. As shown in FIG. 6, the bitstream 650 comprises a sequence parameter set (SPS) 652, a picture parameter set (PPS) 654, a slice header 656, and image data 658.

The SPS 652 contains data that is common to all the pictures in a sequence of pictures (SOP). In contrast, the PPS 654 contains data that is common to the entire picture. The slice header 656 contains information about the current slice such as, for example, the slice type, which of the reference pictures will be used, and so on. The SPS 652 and the PPS 654 may be generically referred to as a parameter set. The SPS 652, the PPS 654, and the slice header 656 are types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important header data that can apply to a large number of VCL NAL units) and supplemental enhancement information (timing information and other supplemental data that may enhance usability of the decoded video signal but are not necessary for decoding the values of the samples in the video pictures). Those skilled in the art will appreciate that the bitstream 650 may contain other parameters and information in practical applications.

The image data 658 of FIG. 6 comprises data associated with the images or video being encoded or decoded. The image data 658 may be simply referred to as the payload or data being carried in the bitstream 650. In an embodiment, the image data 658 comprises the CVS 608 (or CLVS) containing a GDR picture 602, one or more trailing pictures 604, and a recovery point picture 606. In an embodiment, the GDR picture 602 is referred to as a CVS starting (CVSS) picture. The CVS 608 is a coded video sequence for every coded layer video sequence (CLVS) in the video bitstream 650. Notably, the CVS and the CLVS are the same when the video bitstream 650 includes a single layer. The CVS and the CLVS are only different when the video bitstream 650 includes multiple layers. In an embodiment, the trailing pictures 604 may be considered a form of GDR picture since they precede the recovery point picture 606 in the GDR period.

In an embodiment, the GDR picture 602, the trailing pictures 604, and the recovery point picture 606 may define a GDR period in the CVS 608. In an embodiment, a decoding order begins with the GDR picture 602, continues with the trailing pictures 604, and then proceeds to the recovery picture 606.

The CVS 608 is a series of pictures (or portions thereof) starting with the GDR picture 602 and includes all pictures (or portions thereof) up to, but not including, the next GDR picture or until the end of the bitstream. The GDR period is a series of pictures starting with the GDR picture 602 and includes all pictures up to and including the recovery point picture 606. The decoding process for the CVS 608 always starts at the GDR picture 602.

As shown in FIG. 6, the GDR technique 600 or principle works over a series of pictures starting with the GDR picture 602 and ending with the recovery point picture 606. The GDR picture 602 contains a refreshed/clean region 610 containing blocks that have all been coded using intra prediction (i.e., intra-predicted blocks) and an un-refreshed/dirty region 612 containing blocks that have all been coded using inter prediction (i.e., inter-predicted blocks).

The trailing picture 604 immediately adjacent to the GDR picture 602 contains a refreshed/clean region 610 having a first portion 610A coded using intra prediction and a second portion 610B coded using inter prediction. The second portion 610B is coded by referencing the refreshed/clean region 610 of, for example, a preceeding picture within the GDR period of the CVS 608. As shown, the refreshed/clean region 610 of the trailing pictures 604 expands as the coding process moves or progresses in a consistent direction (e.g., from left to right), which correspondingly shrinks the un-refreshed/dirty region 612. Eventually, the recovery point picture 606, which contains only the refreshed/clean region 610, is obtained from the coding process. Notably, and as will be further discussed below, the second portion 610B of the refreshed/clean region 610, which is coded as inter-predicted blocks, may only refer to the refreshed/clean region 610 in the reference picture.

As shown in FIG. 6, the GDR picture 602, the trailing pictures 604, and the recovery point picture 606 in the CVS 608 are each contained within their own VCL NAL unit 630. The set of VCL NAL units 630 in the CVS 608 may be referred to as an access unit.

In an embodiment, the VCL NAL unit 630 containing the GDR picture 602 in the CVS 608 has a GDR NAL unit type (GDR_NUT). That is, in an embodiment the VCL NAL unit 630 containing the GDR picture 602 in the CVS 608 has its own unique NAL unit type relative to the trailing pictures 604 and the recovery point picture 606. In an embodiment, the GDR_NUT permits the bitstream 650 to begin with the GDR picture 602 instead of the bitstream 650 having to begin with an IRAP picture. Designating the VCL NAL unit 630 of the GDR picture 602 as a GDR NUT may indicate to, for example, a decoder that the initial VCL NAL unit 630 in the CVS 608 contains the GDR picture 602. In an embodiment, the GDR picture 602 is the initial picture in the CVS 608. In an embodiment, the GDR picture 602 is the initial picture in the GDR period.

Figure 7:
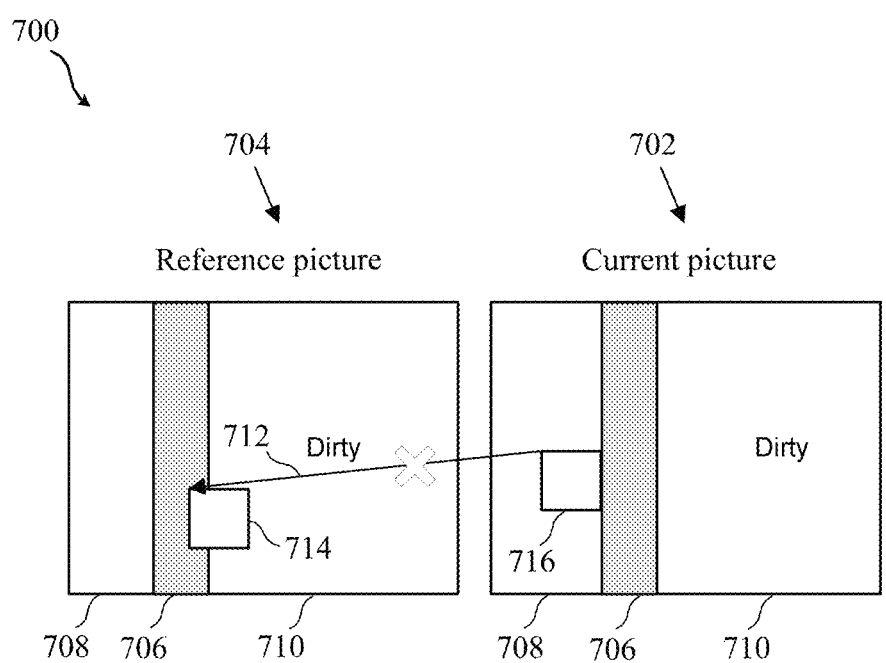
FIG. 7 is a schematic diagram illustrating an undesirable motion search when using the encoder restriction to support GDR.

FIG. 7 is a schematic diagram illustrating an undesirable motion search 700 when using the encoder restriction to support GDR. As shown, the motion search 700 depicts a current picture 702 and a reference picture 704. The current picture 702 and the reference picture 704 each include a refreshed region 706 coded with intra prediction, a refreshed region 708 coded with inter prediction, and an unrefreshed region 710. The refreshed region 706, the refreshed region 708, and the unrefreshed region 710 are silimiar to the the first portion 610A of the refreshed/clean region 610, the second portion 610B of the refreshed/clean region 610, and the un-refreshed/dirty region 612 in FIG. 6.

During the motion search process, the encoder is constrained or prevented from selecting any motion vector 712 that results in some of the samples of the reference block 714 being located outside the refreshed region 706. This occurs even when the reference block 714 provides the best rate-distortion cost criteria when predicting the curent block 716 in the current picture 702. Thus, FIG. 7 illustrates the reason for non-optimality in the motion search 700 when using the encoder restriction for supporting GDR.

Figure 8:
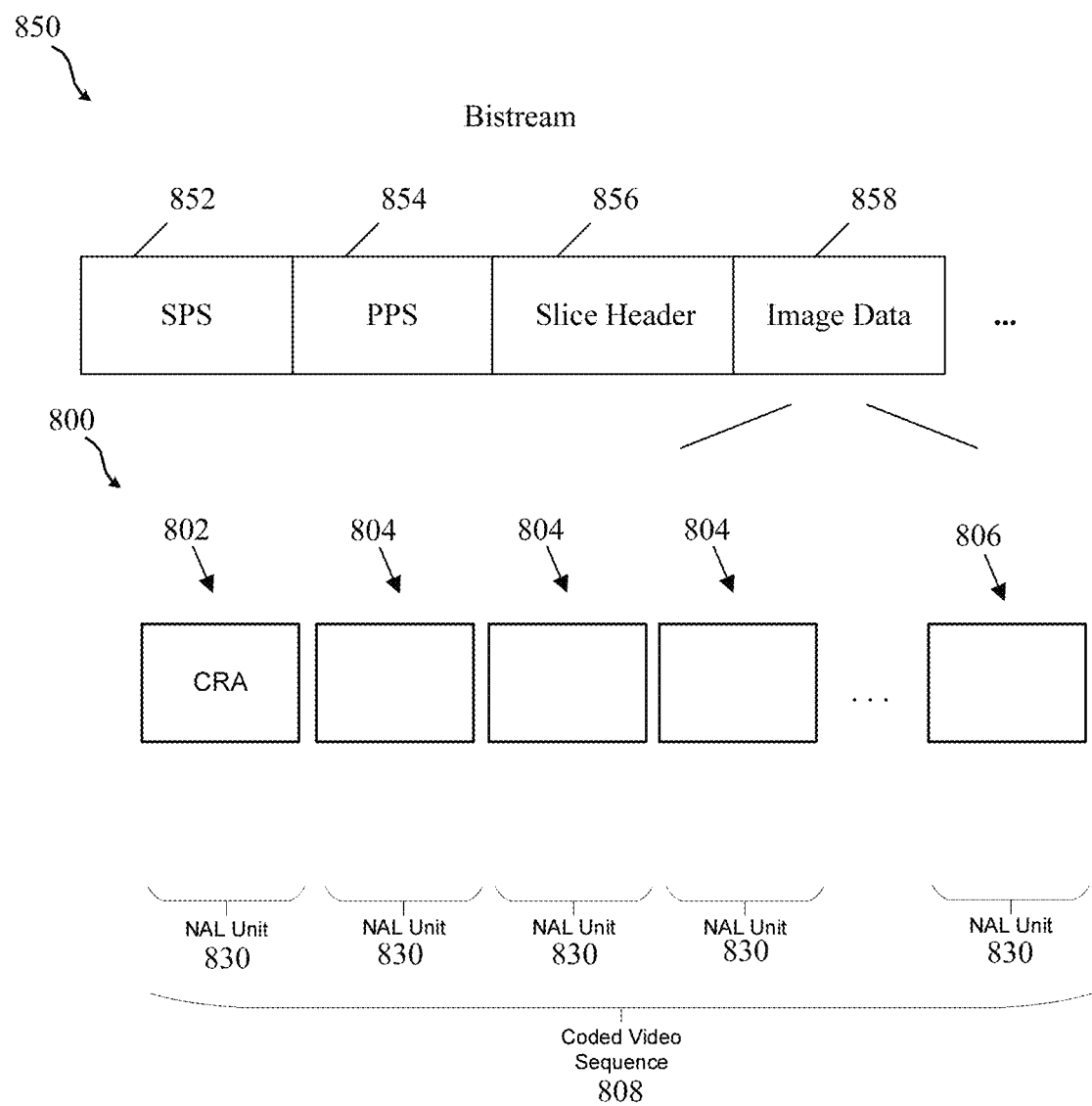
FIG. 8 illustrates a video bitstream configured to implement a clean random access (CRA) technique.

FIG. 8 illustrates a video bitstream 850 configured to implement a clean random access (CRA) technique 800. As used herein the video bitstream 850 may also be referred to as a coded video bitstream, a bitstream, or variations thereof. As shown in FIG. 8, the bitstream 850 comprises a sequence parameter set (SPS) 852, a picture parameter set (PPS) 854, a slice header 856, and image data 858. The bitstream 850, the SPS 852, the PPS 854, and the slice header 856 in FIG. 8 are similar to the bitstream 650, the SPS 652, the PPS 654, and the slice header 656 of FIG. 6. Therefore, for the sake of brevity, a description of these elements will not be repeated.

The image data 858 of FIG. 8 comprises data associated with the images or video being encoded or decoded. The image data 858 may be simply referred to as the payload or data being carried in the bitstream 850. In an embodiment, the image data 858 comprises the CVS 808 (or CLVS) containing a CRA picture 802, one or more trailing pictures 804, and an end of sequence picture picture 806. In an embodiment, the CRA picture 802 is referred to as a CVSS picture. The decoding process for the CVS 808 always starts at the CRA picture 802.

As shown in FIG. 8, the CRA picture 802, the trailing pictures 804, and the end of sequence picture 806 in the CVS 808 are each contained within their own VCL NAL unit 830. The set of VCL NAL units 830 in the CVS 808 may be referred to as an access unit.

Figure 9:
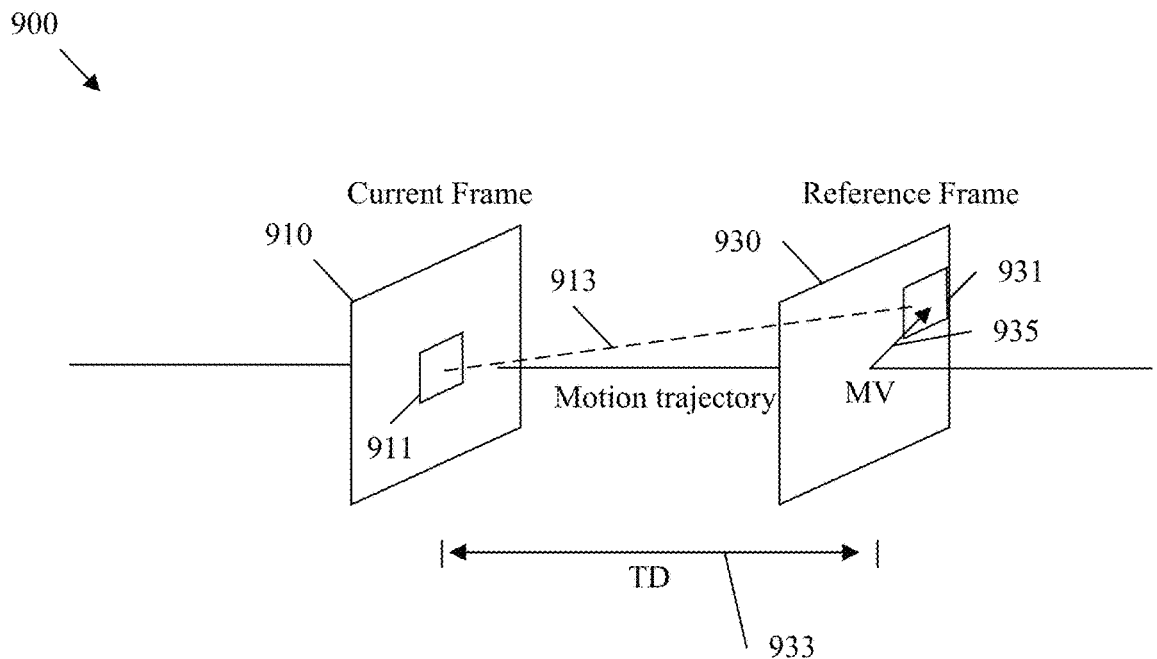
FIG. 9 is a schematic diagram illustrating an example of unidirectional inter-prediction.

FIG. 9 is a schematic diagram illustrating an example of unidirectional inter-prediction 900. Unidirectional inter-prediction 900 can be employed to determine motion vectors for encoded and/or decoded blocks created when partitioning a picture.

Unidirectional inter-prediction 900 employs a reference frame 930 with a reference block 931 to predict a current block 911 in a current frame 910. The reference frame 930 may be temporally positioned after the current frame 910 as shown (e.g., as a subsequent reference frame), but may also be temporally positioned before the current frame 910 (e.g., as a preceding reference frame) in some examples. The current frame 910 is an example frame/picture being encoded/decoded at a particular time. The current frame 910 contains an object in the current block 911 that matches an object in the reference block 931 of the reference frame 930. The reference frame 930 is a frame that is employed as a reference for encoding a current frame 910, and a reference block 931 is a block in the reference frame 930 that contains an object also contained in the current block 911 of the current frame 910.

The current block 911 is any coding unit that is being encoded/decoded at a specified point in the coding process. The current block 911 may be an entire partitioned block, or may be a sub-block when employing affine inter prediction mode. The current frame 910 is separated from the reference frame 930 by some temporal distance (TD) 933. The TD 933 indicates an amount of time between the current frame 910 and the reference frame 930 in a video sequence, and may be measured in units of frames. The prediction information for the current block 911 may reference the reference frame 930 and/or reference block 931 by a reference index indicating the direction and temporal distance between the frames. Over the time period represented by the TD 933, the object in the current block 911 moves from a position in the current frame 910 to another position in the reference frame 930 (e.g., the position of the reference block 931). For example, the object may move along a motion trajectory 913, which is a direction of movement of an object over time. A motion vector 935 describes the direction and magnitude of the movement of the object along the motion trajectory 913 over the TD 933. Accordingly, an encoded motion vector 935, a reference block 931, and a residual including the difference between the current block 911 and the reference block 931 provides information sufficient to reconstruct a current block 911 and position the current block 911 in the current frame 910.

Figure 10:
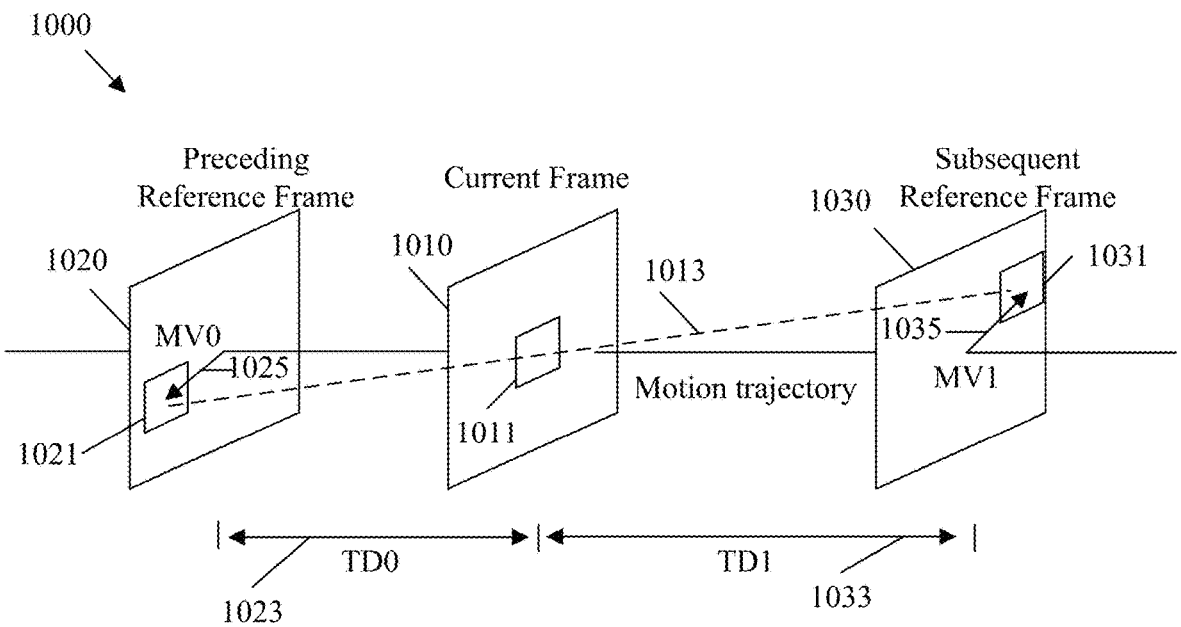
FIG. 10 is a schematic diagram illustrating an example of bidirectional inter-prediction.

FIG. 10 is a schematic diagram illustrating an example of bidirectional inter-prediction 1000. Bidirectional inter-prediction 1000 can be employed to determine motion vectors for encoded and/or decoded blocks created when partitioning a picture.

Bidirectional inter-prediction 1000 is similar to unidirectional inter-prediction 900, but employs a pair of reference frames to predict a current block 1011 in a current frame 1010. Hence current frame 1010 and current block 1011 are substantially similar to current frame 710 and current block 711, respectively. The current frame 1010 is temporally positioned between a preceding reference frame 1020, which occurs before the current frame 1010 in the video sequence, and a subsequent reference frame 1030, which occurs after the current frame 1010 in the video sequence. Preceding reference frame 1020 and subsequent reference frame 1030 are otherwise substantially similar to reference frame 930.

The current block 1011 is matched to a preceding reference block 1021 in the preceding reference frame 1020 and to a subsequent reference block 1031 in the subsequent reference frame 1030. Such a match indicates that, over the course of the video sequence, an object moves from a position at the preceding reference block 1021 to a position at the subsequent reference block 1031 along a motion trajectory 1013 and via the current block 1011. The current frame 1010 is separated from the preceding reference frame 1020 by some preceding temporal distance (TD0) 1023 and separated from the subsequent reference frame 1030 by some subsequent temporal distance (TD1) 1033. The TD0 1023 indicates an amount of time between the preceding reference frame 1020 and the current frame 1010 in the video sequence in units of frames. The TD1 1033 indicates an amount of time between the current frame 1010 and the subsequent reference frame 1030 in the video sequence in units of frame. Hence, the object moves from the preceding reference block 1021 to the current block 1011 along the motion trajectory 1013 over a time period indicated by TD0 1023. The object also moves from the current block 1011 to the subsequent reference block 1031 along the motion trajectory 1013 over a time period indicated by TD1 1033. The prediction information for the current block 1011 may reference the preceding reference frame 1020 and/or preceding reference block 1021 and the subsequent reference frame 1030 and/or subsequent reference block 1031 by a pair of reference indices indicating the direction and temporal distance between the frames.

A preceding motion vector (MV0) 1025 describes the direction and magnitude of the movement of the object along the motion trajectory 1013 over the TD0 1023 (e.g., between the preceding reference frame 1020 and the current frame 1010). A subsequent motion vector (MV1) 1035 describes the direction and magnitude of the movement of the object along the motion trajectory 1013 over the TD1 1033 (e.g., between the current frame 1010 and the subsequent reference frame 1030). As such, in bidirectional inter-prediction 1000, the current block 1011 can be coded and reconstructed by employing the preceding reference block 1021 and/or the subsequent reference block 1031, MV0 1025, and MV1 1035.

In an embodiment, inter-prediction and/or bi-directional inter-prediction may be carried out on a sample-by-sample (e.g., pixel-by-pixel) basis instead of on a block-by-block basis. That is, a motion vector pointing to each sample in the preceding reference block 1021 and/or the subsequent reference block 1031 can be determined for each sample in the current block 1011. In such embodiments, the motion vector 1025 and the motion vector 1035 depicted in FIG. 10 represent a plurality of motion vectors corresponding to the plurality of samples in the current block 1011, the preceding reference block 1021, and the subsequent reference block 1031.

In both merge mode and advanced motion vector prediction (AMVP) mode, a candidate list is generated by adding candidate motion vectors to a candidate list in an order defined by a candidate list determination pattern. Such candidate motion vectors may include motion vectors according to unidirectional inter prediction 900, bidirectional inter prediction 1000, or combinations thereof. Specifically, motion vectors are generated for neighboring blocks when such blocks are encoded. Such motion vectors are added to a candidate list for the current block, and the motion vector for the current block is selected from the candidate list. The motion vector can then be signaled as the index of the selected motion vector in the candidate list. The decoder can construct the candidate list using the same process as the encoder, and can determine the selected motion vector from the candidate list based on the signaled index. Hence, the candidate motion vectors include motion vectors generated according to unidirectional inter-prediction 900 and/or bidirectional inter-prediction 1000, depending on which approach is used when such neighboring blocks are encoded.

Figure 11:
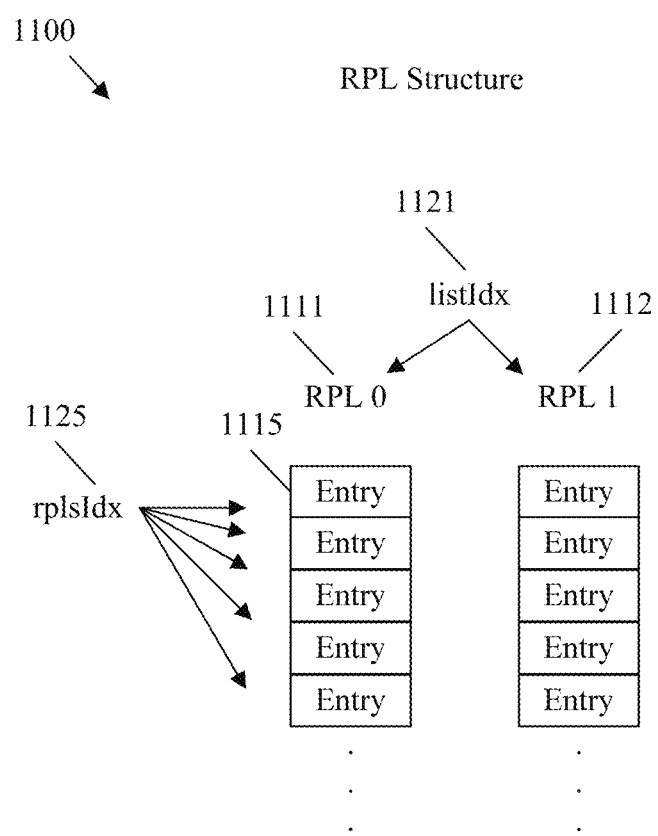
FIG. 11 is a schematic diagram illustrating an example reference picture list structure.

FIG. 11 is a schematic diagram illustrating an example reference picture list structure 1100. A reference picture list structure 1100 can be employed to store indications of reference pictures and/or inter-layer reference pictures used in unidirectional inter-prediction 900 and/or bidirectional inter-prediction 1000. Hence, the reference picture list structure 1100 can be employed by a codec system 200, an encoder 300, and/or a decoder 400 when performing method 100.

Reference picture list structure 1100, which is also known as an RPL structure, is an addressable syntax structure that contains multiple reference picture lists, such as RPL 0 1111 and RPL 1 1112. The reference picture list structure 1100 may be stored in a SPS, a picture header, and/or a slice header of a bitstream, depending on the example. A reference picture list, such as RPL 0 1111 and RPL 1 1112, is a list of reference pictures used for inter-prediction and/or inter-layer prediction. Specifically, reference pictures used by unidirectional inter-prediction 900 are stored in RPL 0 1111 and reference pictures used by bidirectional inter-prediction 1000 are stored in both RPL 0 1111 and RPL 1 1112. For example, bidirectional inter-prediction 1000 may use one reference picture from RPL 0 1111 and one reference picture from RPL 1 1112. RPL 0 1111 and RPL 1 1112 may each include a plurality of entries 1115. A reference picture list structure entry 1115 is an addressable location in a reference picture list structure 1100 that indicates a reference picture associated with a reference picture list, such as RPL 0 1111 and/or RPL 1 1112.

In a specific example, the reference picture list structure 1100 can be denoted as ref_pic_list_struct(listIdx, rplsIdx) where listIdx 1121 identifies a reference picture list RPL 0 1111 and/or RPL 1 1112 and rplsIdx 1125 identifies an entry 1115 in the reference picture list. Accordingly, ref_pic_list_struct is a syntax structure that returns the entry 1115 based on listIdx 1121 and rplsIdx 1125. An encoder can encode a portion of the reference picture list structure 1100 for each non-intra-coded slice in a video sequence. A decoder can then resolve the corresponding portion of the reference picture list structure 1100 before decoding each non-intra-coded slice in a coded video sequence. In an embodiment, the reference picture lists discussed herein are coded, constructed, derived, or otherwise obtained by the encoder or decoder using information stored in the encoder or decoder, obtained at least in part from the bitstream, and so on.

Figure 12A:
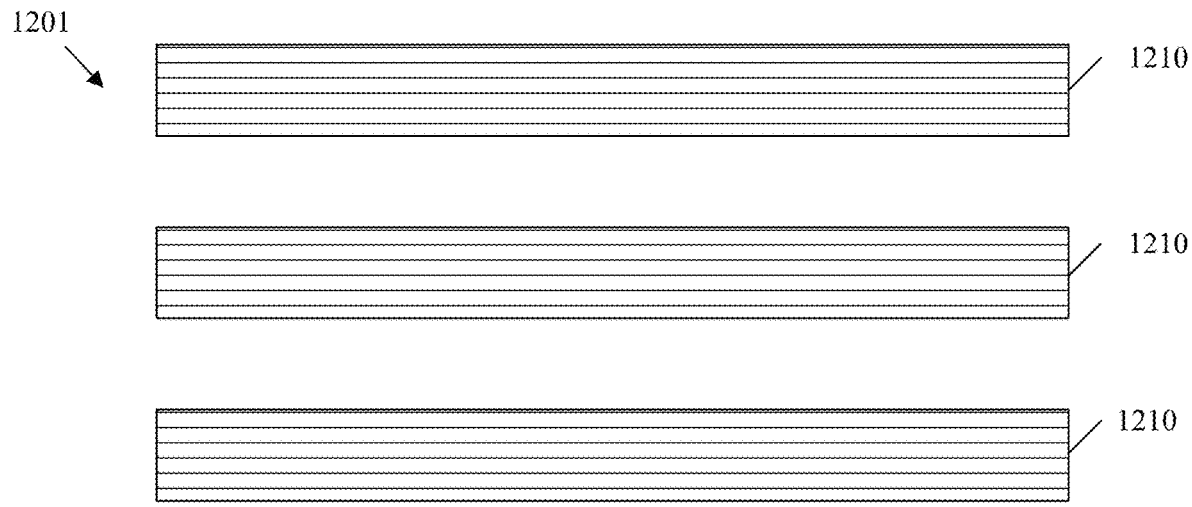
FIGS. 12A-12C are schematic diagrams collectively illustrating an example of interlaced video coding.
Figure 12B:
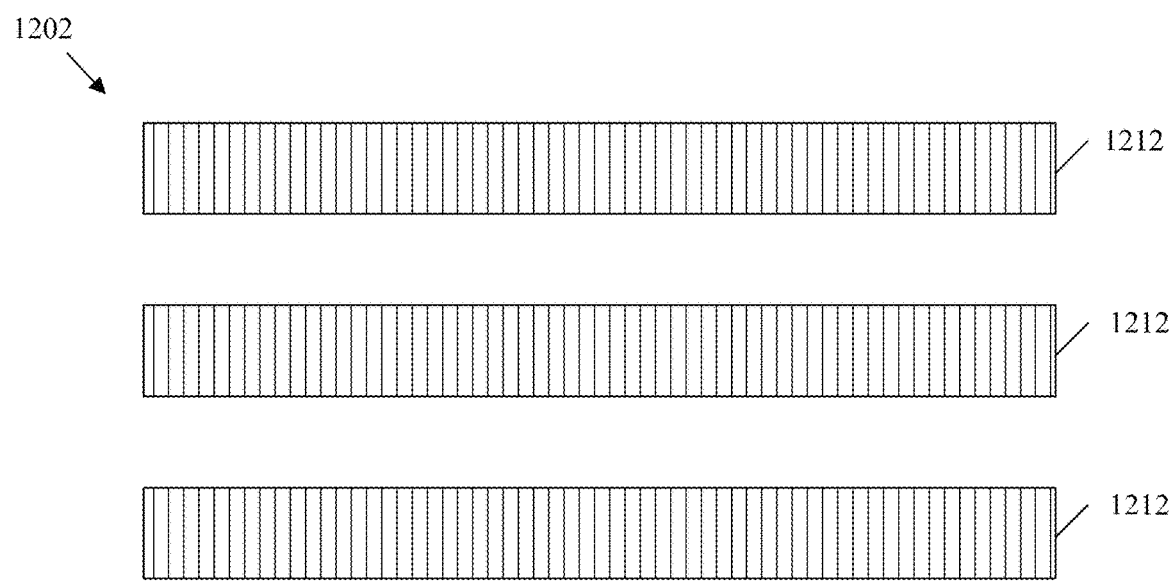
Figure 12C:
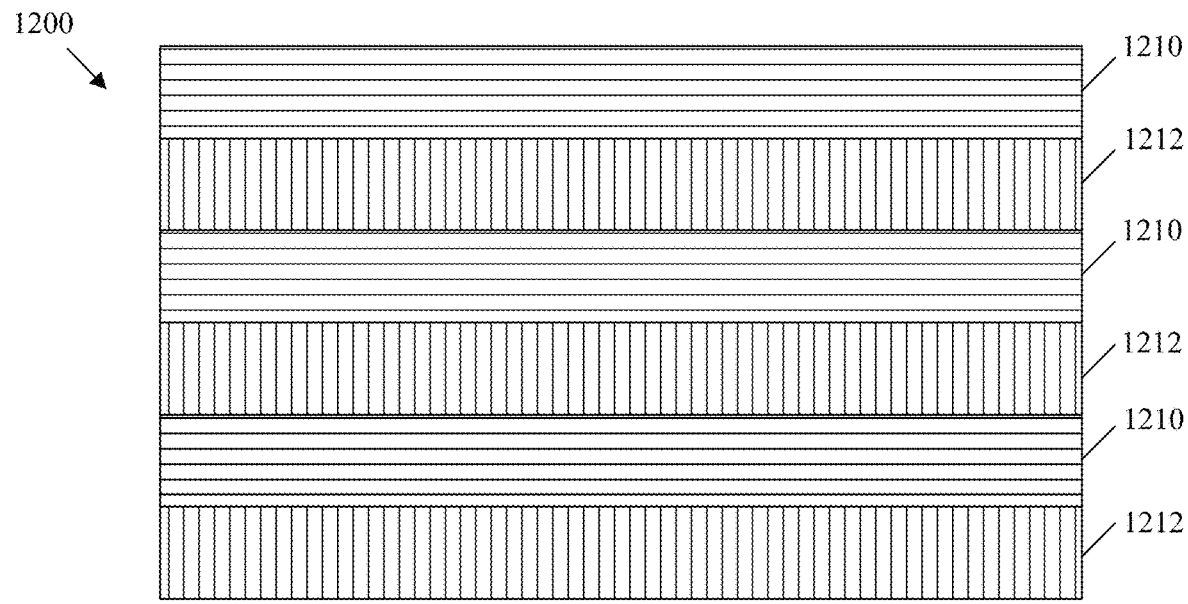

FIGS. 12A-12C are schematic diagrams collectively illustrating an example of interlaced video coding. Interlaced video coding generates an interlaced video frame 1200, as shown in FIG. 12C, from a first picture 1201 and a second picture 1202, as shown in FIGS. 12A and 12B. For example, interlaced video coding may be employed by an encoder, such as codec system 200 and/or encoder 300, when encoding video containing an interlaced video frame 1200 as part of method 100. Further, a decoder, such as codec system 200 and/or decoder 400, may decode video including an interlaced video frame 1200. In addition, an interlaced video frame 1200 may be encoded into a CVS, such as CVS 500 of FIG. 5, as discussed in more detail with respect to FIG. 13, below.

When performing interlaced video coding, a first field 1210 is captured at a first time and encoded into a first picture 1201 as shown in FIG. 12A. The first field 1210 includes horizontal lines of video data. Specifically, the horizontal lines of video data in the first field 1210 extend from the left boundary of the first picture 1201 to the right boundary of the first picture 1201. However, first field 1210 omits alternating rows of video data. In an example implementation, the first field 1210 contains half of the video data captured by a video capturing device at the first time.

As shown in FIG. 12B, a second field 1212 is captured at a second time and encoded into a second picture 1202. For example, the second time may be immediately following the first time by a value set based on a frame rate set for a video. For example, in a video set to display at a frame rate of fifteen frames per second (FPS), the second time may occur one fifteenth of a second after the first time. As shown, the second field 1212 includes horizontal lines of video data that are complementary to the horizontal lines of the first field 1210 of the first picture 1201. Specifically, the horizontal lines of video data in the second field 1212 extend from the left boundary of the second picture 1202 to the right boundary of the second picture 1202. The second field 1212 contains the horizontal lines omitted by the first field 1210. In addition, the second field 1212 omits the horizontal lines contained in the first field 1210.

The first field 1210 of the first picture 1201 and the second field 1212 of the second picture 1202 can be combined for display at a decoder as an interlaced video frame 1200 as shown in FIG. 12C. Specifically, the interlaced video frame 1200 contains the first field 1210 of the first picture 1201 captured at the first time and the second field 1212 of the second picture 1202 captured at the second time. Such a combination has the visual effect of emphasizing and/or exaggerating motion. When displayed as part of a video, a series of interlaced video frames 1200 creates the impression that the video is encoded at an increased frame rate without the need to actually encode the additional frames. In this way, interlaced video coding that employs an interlaced video frame 1200 can increase the effective frame rate of a video without an attendant increase in video data size. As such, interlaced video coding may increase the coding efficiency of an encoded video sequence.

Figure 13:
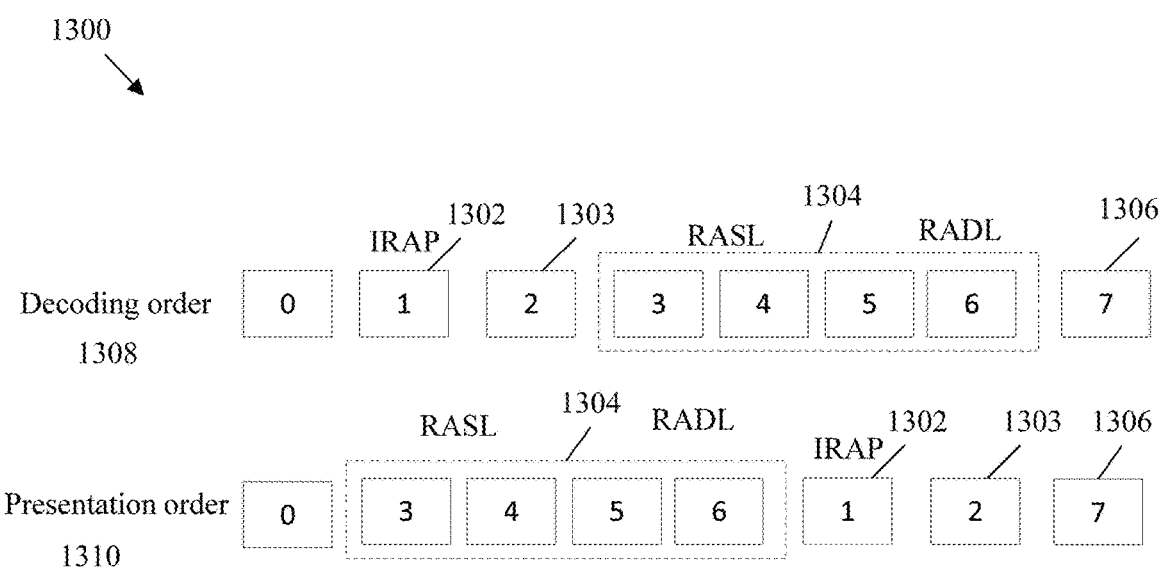
FIG. 13 is a schematic diagram illustrating an example coded video sequence (CVS) employing both interlaced video coding and leading pictures.

FIG. 13 is a schematic diagram illustrating an example CVS 1300 employing both interlaced video coding, for example to create an interlaced video frame 1200, and leading pictures. CVS 1300 is substantially similar to CVS 500, but is modified to encode pictures with fields, such as the first picture 1201 and second picture 1202, while retaining leading pictures. For example, CVS 1300 may be encoded by an encoder, such as codec system 200 and/or encoder 300, according to method 100. Further, the CVS 1300 may be decoded by a decoder, such as codec system 200 and/or decoder 400.

The CVS 1300 has a decoding order 1308 and a presentation order 1310 (a.k.a., output order), which operate in a manner substantially similar to decoding order 508 and presentation order 510, respectively. The CVS 1300 also contains an IRAP picture 1302, leading pictures 1304, and trailing pictures 1306, which are similar to IRAP picture 502, leading pictures 504, and trailing pictures 506. The difference is that the IRAP picture 1302, leading pictures 1304, and trailing pictures 1306 are all coded by employing fields in a manner substantially similar to the first field 1210 and the second field 1212 as described with respect to FIGS. 12A-12C. As such, each frame includes two pictures. Accordingly, the CVS 1300 contains twice as many pictures as CVS 500. However, CVS 1300 contains approximately the same amount of data as CVS 500 because the pictures of CVS 1300 each omit half of the frame.

An issue with CVS 1300 is that the IRAP picture 1302 is encoded by including a first field of intra-prediction coded data. The second field of intra-prediction coded data is then included in a non-leading picture 1303. The non-leading picture 1303 is not an IRAP picture 1302 because a decoder cannot begin decoding the CVS 1300 at the non-leading picture 1303. This is because doing so would omit half of the frame associated with the IRAP picture 1302. This creates a problem because video coding systems employing VVC may be constrained to position the leading pictures 1304 immediately following the IRAP picture 1302 in decoding order 1308.

In an embodiment, a flag may be signaled to indicate when a single non-leading picture 1303 is allowed to be positioned between the IRAP picture 1302 and the leading pictures 1304. The video system may still be constrained to prevent non-leading pictures 1303 and/or trailing pictures 1306 from being positioned between the leading pictures 1304. Accordingly, the flag may indicate that the decoding order 1308 includes an IRAP picture 1302, a single non-leading picture 1303, any leading pictures 1304 (e.g., leading pictures 1304 are optional and may be omitted in some examples), and then one or more trailing pictures 1306. As such, the flag can indicate to the decoder whether to expect a CVS 500 or a CVS 1300.

Figure 14:
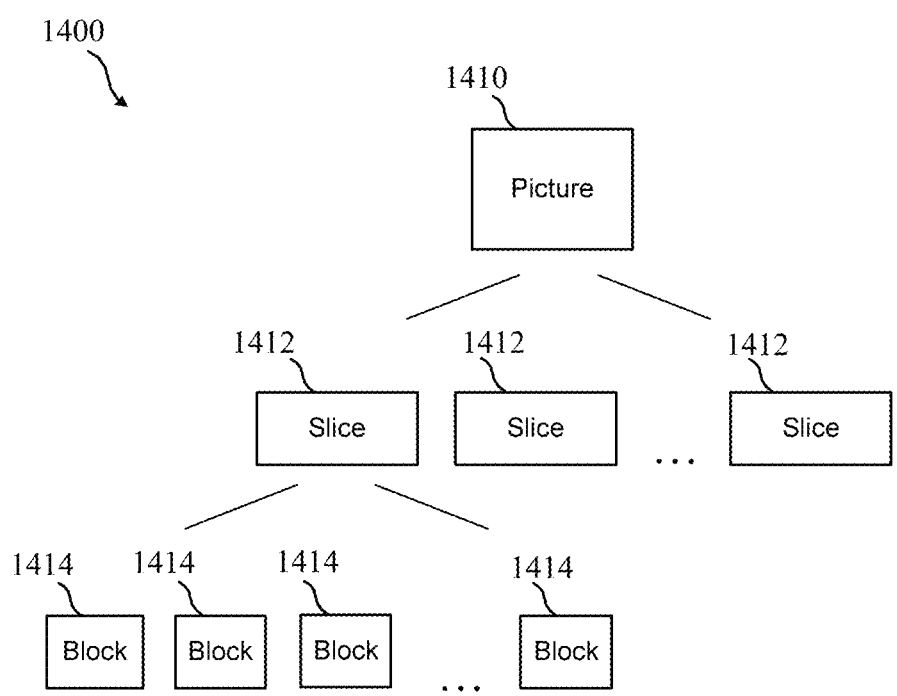
FIG. 14 illustrates a partitioning technique for a picture.

FIG. 14 illustrates a partitioning technique 1400 for a picture 1410. The picture 1410 may be similar to any of the pictures discussed herein (e.g., the pictures 502-506, 602-606, 702-704, and 802-806). As shown, the picture 1410 may be partitioned into a plurality of slices 1412. A slice is a spatially distinct region of a frame (e.g., a picture) that is encoded separately from any other region in the same frame. While three slices 1412 are depicted in FIG. 14, more or fewer slices may be used in practical applications. Each slice 1412 may be partitioned into a plurality of blocks 1414. The blocks 1414 in FIG. 14 may be similar to the current block 1011, the preceding reference block 1021, and the subsequent reference block 1031 in FIG. 10. The block 1414 may represent a CU. While four blocks 1414 are depicted in FIG. 14, more or fewer blocks may be used in practical applications.

Figure 15:
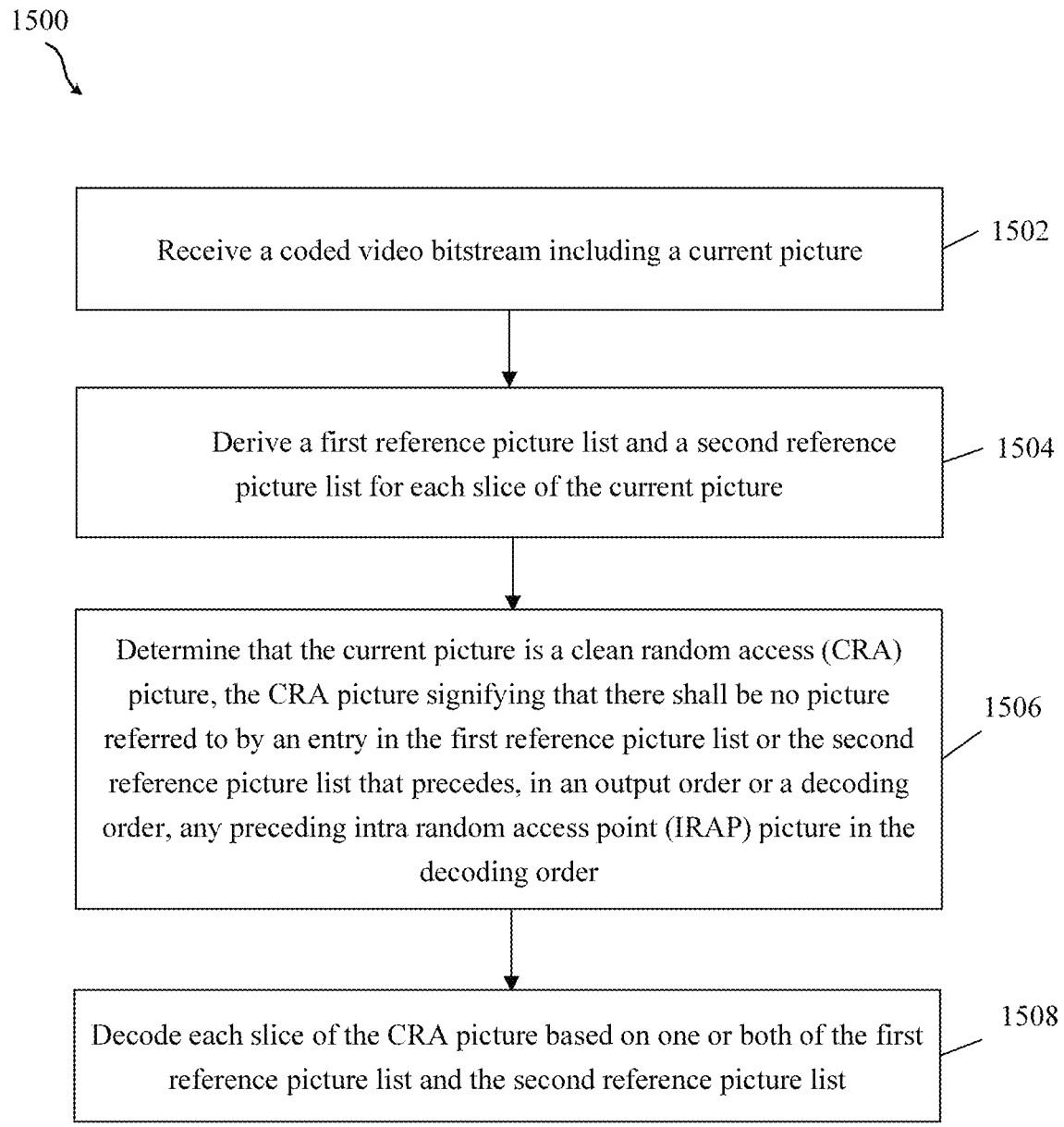
FIG. 15 is an embodiment of a method of decoding.

FIG. 15 is an embodiment of a method 1500 of decoding. The method 1500 can be employed by a video decoder (e.g., decoder 400). The method 1500 may be performed after a coded video bitstream has been directly or indirectly received from a video encoder (e.g., video encoder 300). The method 1500 improves the decoding process by constraining reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Therefore, as a practical matter, the performance of a codec is improved, which leads to a better user experience.

In block 1502, the video decoder receives a coded video bitstream including a current picture. In block 1504, the video decoder derives a first reference picture list and a second reference picture list for each slice of the current picture. In an embodiment, the reference picture lists are coded, constructed, or otherwise obtained by the decoder using information stored in the decoder, obtained at least in part from the bitstream, and so on.

In block 1506, the video decoder determines that the current picture is a clean random access (CRA) picture. The CRA picture signifies that there shall be no picture referred to by an entry in the first reference picture list or the second reference picture list that precedes, in an output order or a decoding order, any preceding intra random access point (IRAP) picture in the decoding order.

In an embodiment, the preceding IRAP picture precedes the CRA picture in the output order or the decoding order. In an embodiment, the preceding IRAP picture starts a coded video sequence (CVS) that contains the CRA picture. In an embodiment, the first reference picture list is designated RefPicList[0] and the second reference picture list is designated RefPicList[1].

In block 1508, the video decoder decodes each slice of the CRA picture based on one or both of the first reference picture list and the second reference picture list. In an embodiment, one or more pictures following the CRA picture in the decoding order are decoded using inter prediction. In an embodiment, the method 1500 further comprises displaying, on a display of the video decoder, an image generated based on the CRA picture.

Figure 16:
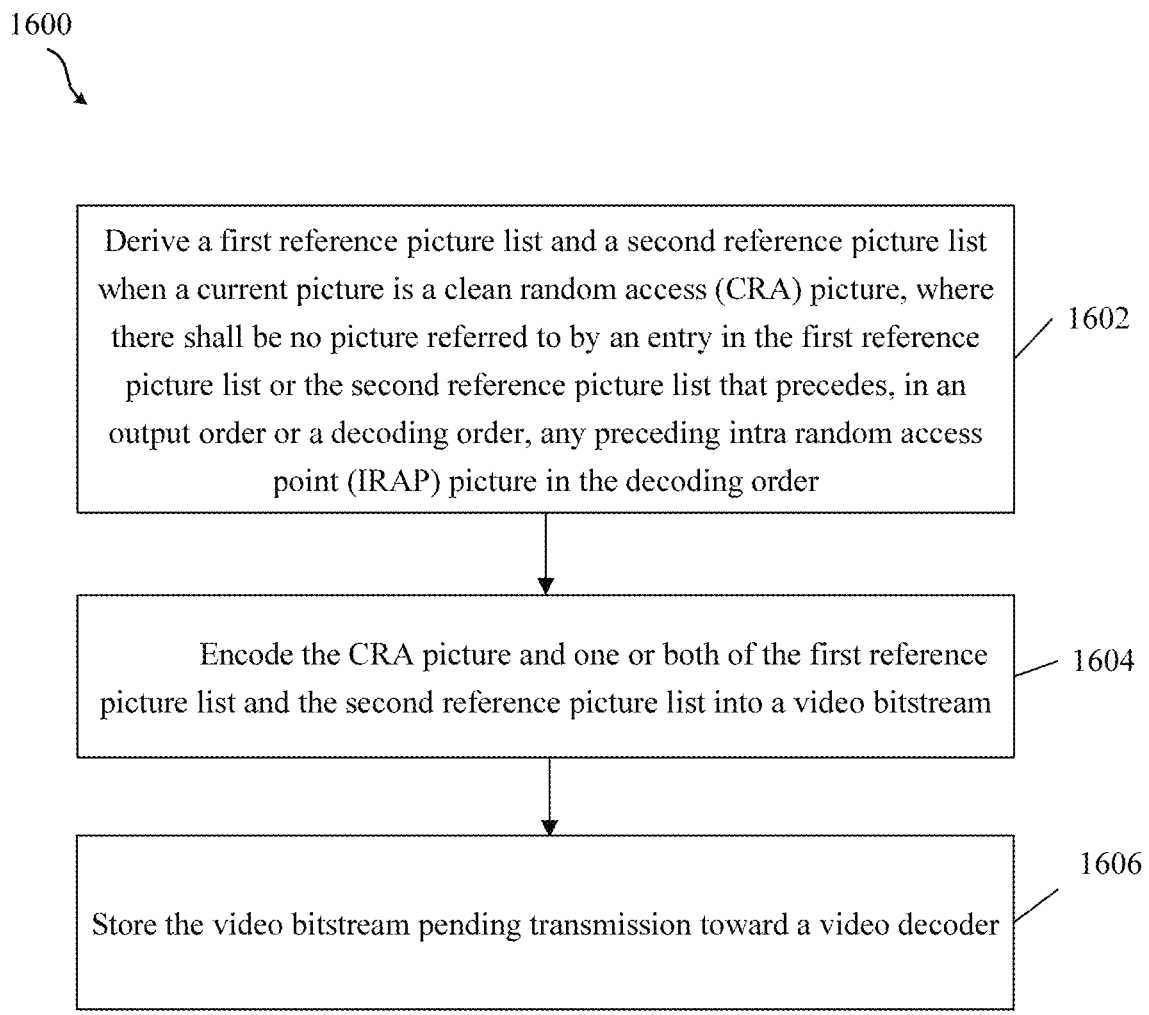
FIG. 16 is an embodiment of a method of encoding.

FIG. 16 is an embodiment of a method 1600 of encoding. The method 1600 can be employed by a video encoder (e.g., video encoder 300). The method may be performed when a picture (e.g., from a video) is to be encoded into a video bitstream and then transmitted toward a video decoder (e.g., video decoder 400). The method 1600 improves the encoding process by constraining reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Therefore, as a practical matter, the performance of a codec is improved, which leads to a better user experience.

In block 1602, the video encoder derives a first reference picture list and a second reference picture list when a current picture is a clean random access (CRA) picture. In an embodiment, there shall be no picture referred to by an entry in the first reference picture list or the second reference picture list that precedes, in an output order or a decoding order, any preceding intra random access point (IRAP) picture in the decoding order. In an embodiment, the reference picture lists are coded, constructed, or otherwise obtained by the encoder using information stored in the encoder, obtained at least in part from the bitstream, and so on.

In an embodiment, the preceding IRAP picture precedes the CRA picture in the output order or the decoding order. In an embodiment, the preceding IRAP picture starts a coded video sequence (CVS) that contains the CRA picture. In an embodiment, the first reference picture list is designated RefPicList[0] and the second reference picture list is designated RefPicList[1].

In block 1604, the video encoder encodes the CRA picture and one or both of the first reference picture list and the second reference picture list into a video bitstream.

In block 1606, the video encoder stores the video bitstream pending transmission toward a video decoder. In an embodiment, the video encoder transmits the video bitstream toward the video decoder.

Figure 17:
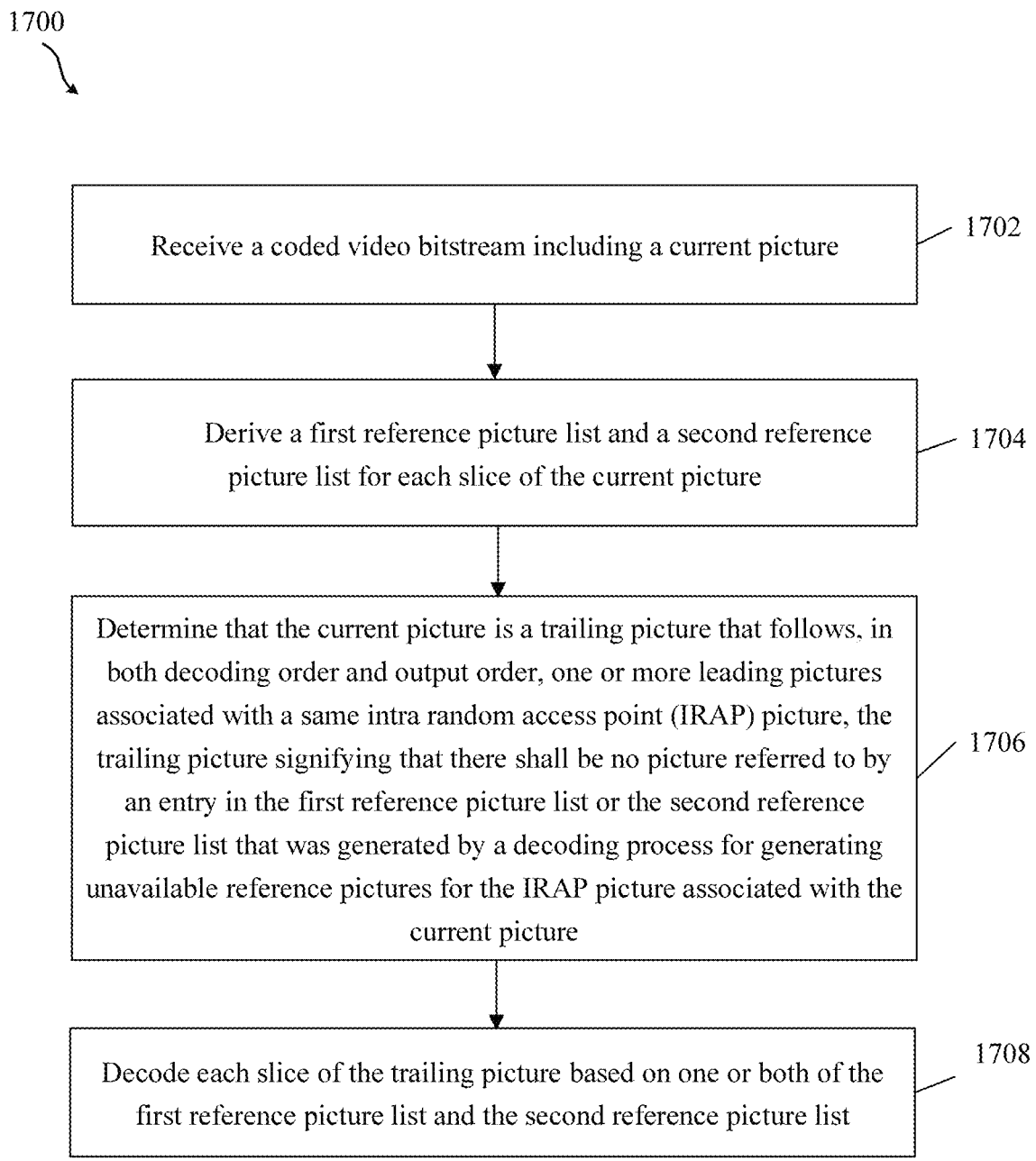
FIG. 17 is an embodiment of a method of decoding.

FIG. 17 is an embodiment of a method 1700 of decoding. The method 1700 can be employed by a video decoder (e.g., decoder 400). The method 1700 may be performed after a coded video bitstream has been directly or indirectly received from a video encoder (e.g., video encoder 300). The method 1700 improves the decoding process by constraining reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Therefore, as a practical matter, the performance of a codec is improved, which leads to a better user experience.

In block 1702, the video decoder receives a coded video bitstream including a current picture. In block 1704, the video decoder derives a first reference picture list and a second reference picture list for each slice of the current picture. In an embodiment, the reference picture lists are coded, constructed, or otherwise obtained by the decoder using information stored in the decoder, obtained at least in part from the bitstream, and so on.

In block 1706, the video decoder determines that the current picture is a trailing picture that follows, in both decoding order and output order, one or more leading pictures associated with a same intra random access point (IRAP) picture. The trailing picture signifies that there shall be no picture referred to by an entry in the first reference picture list or the second reference picture list that was generated by a decoding process for generating unavailable reference pictures for the IRAP picture associated with the current picture. In an embodiment, the same IRAP picture starts a coded video sequence (CVS) that contains the trailing picture and the one or more leading pictures.

In some cases, a picture is used as a random access point without refreshing the DPB. For example, GDR pictures and CRA pictures may be used as random access points and may not refresh the DPB. Accordingly, a GDR picture and inter-coded pictures associated with a GDR and/or a CRA picture may reference a reference picture in the DPB that precedes the GDR/CRA picture. When the GDR/CRA picture is used as a random access point, the DPB at the decoder may be empty as the GDR/CRA picture is used as a starting point for displaying a video sequence. Hence, a current picture may reference a previous picture in the video sequence that is available at the encoder during encoding, but is not available at the decoder because the reference picture has not been transmitted. Such a reference picture is referred to as an unavailable reference picture. In such a case, a process for generating unavailable reference pictures can be invoked at the decoder. The process for generating unavailable reference pictures employs bitstream parameters to generate a rough approximation of the unavailable reference picture. The generated unavailable reference picture may not be displayed because the quality of the generated unavailable reference picture may not be sufficient for display. However, the generated unavailable reference picture provides sufficient data to support decoding the current picture that references the unavailable reference picture.

In an embodiment, the decoding process for generating unavailable reference pictures is invoked once per coded picture for a clean random access (CRA) picture with a NoOutPutBeforeRecoveryFlag equal to one or a gradual decoding refresh (GDR) picture with the NoOutPutBeforeRecoveryFlag equal to one.

When the decoding process for generating unavailable reference pictures process is invoked, the following applies:

For each RefPicList[i][j], with i in the range of 0 to 1, inclusive, and j in the range of 0 to num_ref_entries[i][RplsIdx[i]]−1, inclusive, that is equal to "no reference picture", a picture is generated as specified in subclause 8.3.4.2 "Generation of one unavailable picture" of the VVC standard and the following applies:

The value of nuh_layer_id for the generated picture is set equal to nuh_layer_id of the current picture.

If st_ref_pic_flag[i][RplsIdx[i]][j] is equal to 1 and inter_layer_ref_pic_flag[i][RplsIdx[i]][j] is equal to 0, the value of PicOrderCntVal for the generated picture is set equal to RefPicPocList[i][j] and the generated picture is marked as "used for short-term reference".

Otherwise, when st_ref_pic_flag[i][RplsIdx[i]][j] is equal to 0 and inter_layer_ref_pic_flag[i][RplsIdx[i]][j] is equal to 0, the value of PicOrderCntVal for the generated picture is set equal to RefPicLtPocList[i][j], the value of ph_pic_order_cnt_lsb for the generated picture is inferred to be equal to (RefPicLtPocList[i][j]& (MaxPicOrderCntLab−1)), and the generated picture is marked as "used for long-term reference".

The value of PictureOutputFlag for the generated reference picture is set equal to 0.

RefPicList[i][j] is set to be the generated reference picture.

Generation of one unavailable picture is as follows.

When this process is invoked, an unavailable picture is generated as follows:

The value of each element in the sample array SL for the picture is set equal to 1<<(BitDepth−1).

When ChromaArrayType is not equal to 0, the value of each element in the sample arrays SCb and SCr for the picture is set equal to 1<<(BitDepth−1).

The prediction mode CuPredMode[0][x][y] is set equal to MODE_INTRA for x ranging from 0 to pps_pic_width_in_luma_samples−1, inclusive, and y ranging from 0 to pps_pic_height_in_luma_samples−1, inclusive.

NOTE—The output of the recovery point picture following a GDR picture with NoOutputBeforeRecoveryFlag equal to 1 and the pictures following that recovery point picture in output order and decoding order is independent of the values set for the elements of SL, SCb, SCr and CuPredMode[0][x][y].

nuh_layer_id specifies the identifier of the layer to which a VCL NAL unit belongs or the identifier of a layer to which a non-VCL NAL unit applies. RplsIdx is a reference picture list index. st_ref_pic_flag is a flag in the reference picture list syntax structure that signifies whether the reference picture list is a short term reference picture entry. PicOrderCntVal represents a value of the picture order count (POC). MaxPicOrderCntLsb represents the least significant bit(s) for a maximum picture order count. PictureOutputFlag is a flag that signifies whether a picture is output.

In block 1708, the video decoder decodes each slice of the trailing picture based on one or both of the first reference picture list and the second reference picture list. In an embodiment, the same TRAP picture is decoded using intra prediction, and the trailing picture and the one or more leading pictures are decoded using inter prediction. In an embodiment, the method 1700 further comprises displaying, on a display of the video decoder, an image generated based on the tailing picture.

Figure 18:
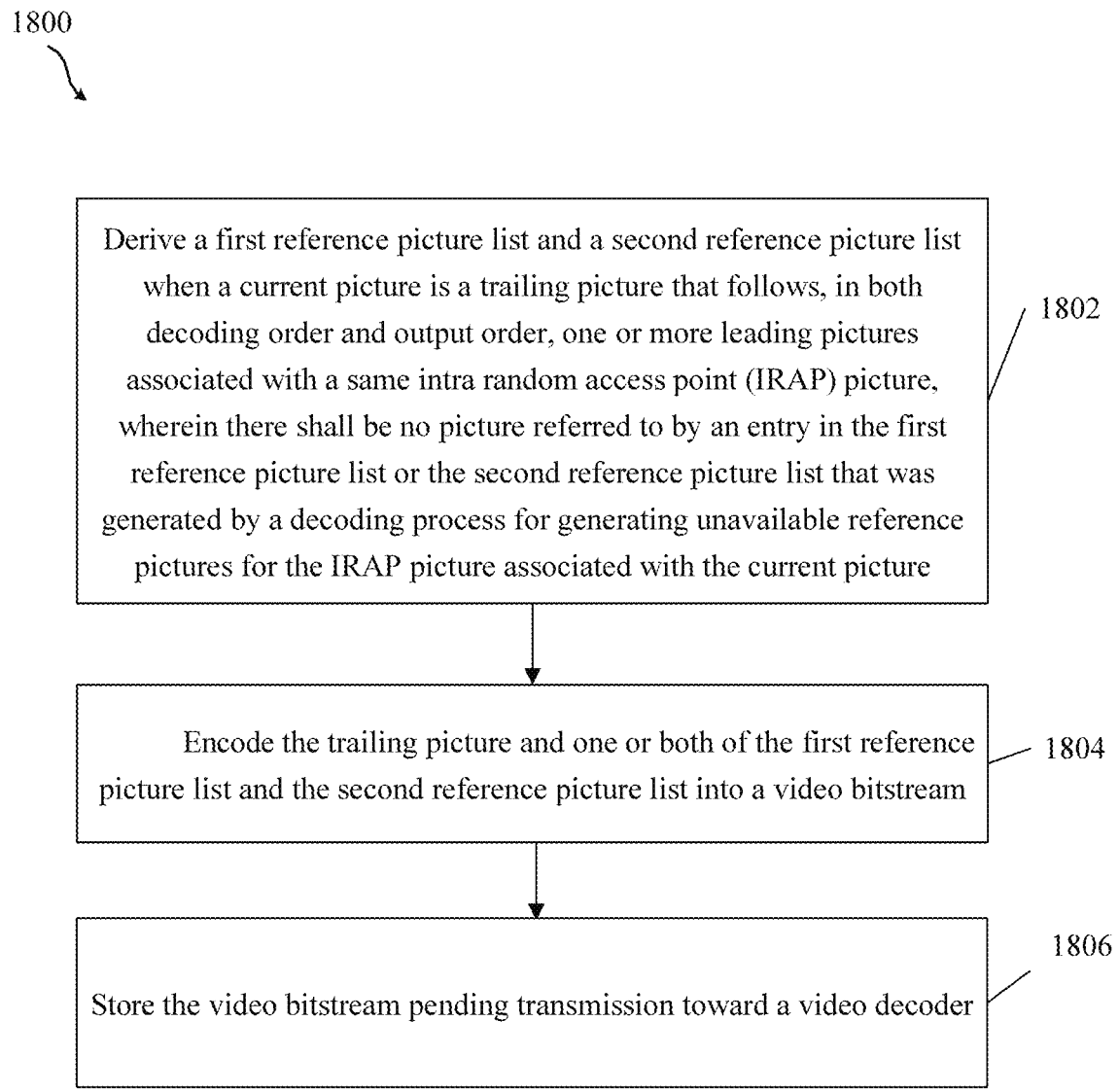
FIG. 18 is an embodiment of a method of encoding.

FIG. 18 is an embodiment of a method 1800 of encoding. The method 1800 can be employed by a video encoder (e.g., video encoder 300). The method may be performed when a picture (e.g., from a video) is to be encoded into a video bitstream and then transmitted toward a video decoder (e.g., video decoder 400). The method 1800 improves the encoding process by constraining reference picture lists from including an entry that refers to certain pictures when a current picture is a particular type of picture (e.g., a CRA picture, a trailing picture, a trailing picture that follows in both decoding order and output order one or more leading pictures associated with the same TRAP picture, and a RADL picture). By limiting reference picture lists in this way, coding errors and the amount of bandwidth and/or the network resources needed for coding may be reduced relative to conventional coding techniques. Therefore, as a practical matter, the performance of a codec is improved, which leads to a better user experience.

In block 1802, the video encoder derives a first reference picture list and a second reference picture list when a current picture is a trailing picture that follows, in both decoding order and output order, one or more leading pictures associated with a same intra random access point (TRAP) picture. In an embodiment, there shall be no picture referred to by an entry in the first reference picture list or the second reference picture list that was generated by a decoding process for generating unavailable reference pictures for the TRAP picture associated with the current picture. In an embodiment, the reference picture lists are coded, constructed, or otherwise obtained by the encoder using information stored in the encoder, obtained at least in part from the bitstream, and so on.

In an embodiment, the decoding process for generating unavailable reference pictures is invoked once per coded picture for a clean random access (CRA) picture with a NoOutPutBeforeRecoveryFlag equal to one or a gradual decoding refresh (GDR) picture with the NoOutPutBeforeRecoveryFlag equal to one.

In an embodiment, the video encoder is able to perform a check each time the NoOutPutBeforeRecoveryFlag is equal to one to ensure that the reference picture lists do not refer to any reference pictures from a previous CVS because such pictures would be unavailable at the video decoder when the CRA or GDR picture is chosen as a random access point. In such a case, the video encoder performs this check because the video decoder will also perform this check.

In an embodiment, the same IRAP picture starts a coded video sequence (CVS) that contains the trailing picture and the one or more leading pictures. In an embodiment, the same IRAP picture is encoded into the video bitstream using intra prediction, and wherein the trailing picture and the one or more leading pictures are encoded using inter prediction.

In block 1804, the video encoder encodes the trailing picture and one or both of the first reference picture list and the second reference picture list into a video bitstream.

In block 1806, the video encoder stores the video bitstream pending transmission toward a video decoder. In an embodiment, the video encoder transmits the video bitstream toward the video decoder.

Figure 19:
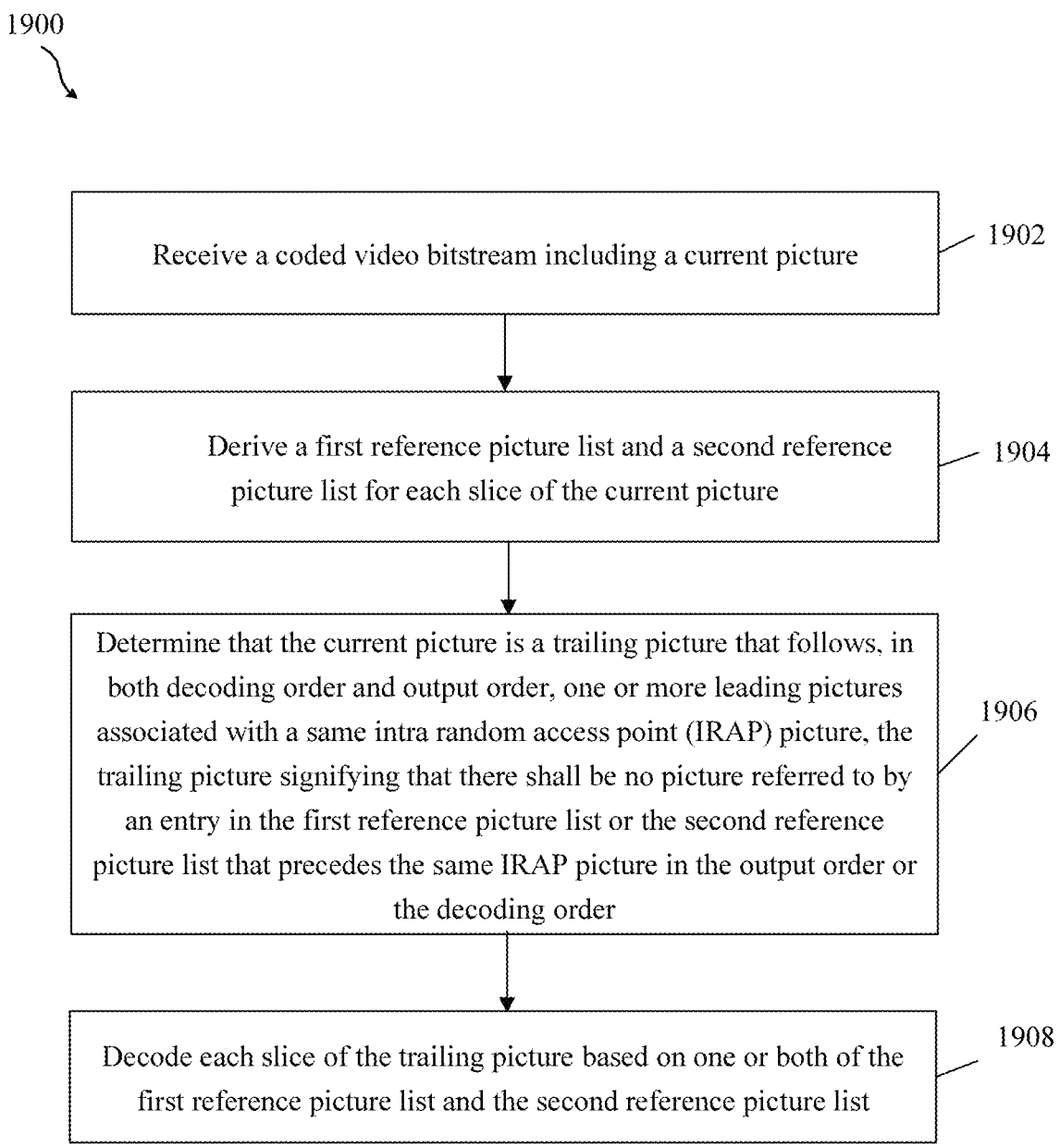
FIG. 19 is an embodiment of a method of decoding.

FIG. 19 is an embodiment of a method 1900 of decoding. The method 1900 can be employed by a video decoder (e.g., decoder 400). The method 1900 may be performed after a coded video bitstream has been directly or indirectly received from a video encoder (e.g., video encoder 300). The method 1900 improves the decoding process by constraining reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Therefore, as a practical matter, the performance of a codec is improved, which leads to a better user experience.

In block 1902, the video decoder receives a coded video bitstream including a current picture. In block 1904, the video decoder derives a first reference picture list and a second reference picture list for each slice of the current picture. In an embodiment, the reference picture lists are coded, constructed, or otherwise obtained by the decoder using information stored in the decoder, obtained at least in part from the bitstream, and so on.

In block 1906, the video decoder determines that the current picture is a trailing picture that follows, in both decoding order and output order, one or more leading pictures associated with a same intra random access point (IRAP) picture. The trailing picture signifying that there shall be no picture referred to by an entry in the first reference picture list or the second reference picture list that precedes the same IRAP picture in the output order or the decoding order.

In an embodiment, the same IRAP picture starts a coded video sequence (CVS) that contains the trailing picture and the one or more leading pictures.

In block 1908, the video decoder decodes each slice of the trailing picture based on one or both of the first reference picture list and the second reference picture list. In an embodiment, the same IRAP picture is decoded using intra prediction, and the trailing picture and the one or more leading pictures are decoded using inter prediction. In an embodiment, the method 1900 further comprises displaying, on a display of the video decoder, an image generated based on the trailing picture.

FIG. 20 is an embodiment of a method 2000 of encoding. The method 2000 can be employed by a video encoder (e.g., video encoder 300). The method may be performed when a picture (e.g., from a video) is to be encoded into a video bitstream and then transmitted toward a video decoder (e.g., video decoder 400). The method 2000 improves the encoding process by constraining reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Therefore, as a practical matter, the performance of a codec is improved, which leads to a better user experience.

In block 2002, the video encoder derives a first reference picture list and a second reference picture list when a current picture is a trailing picture that follows, in both decoding order and output order, one or more leading pictures associated with a same intra random access point (IRAP) picture. In an embodiment, there shall be no picture referred to by an entry in the first reference picture list or the second reference picture list that precedes the same IRAP picture in the output order or the decoding order. In an embodiment, the reference picture lists are coded, constructed, or otherwise obtained by the encoder using information stored in the encoder, obtained at least in part from the bitstream, and so on.

In an embodiment, the same IRAP picture starts a coded video sequence (CVS) that contains the trailing picture and the one or more leading pictures. In an embodiment, the same IRAP picture is encoded into the video bitstream using intra prediction, and wherein the trailing picture and the one or more leading pictures are encoded using inter prediction.

In block 2004, the video encoder encodes the trailing picture and one or both of the first reference picture list and the second reference picture list into a video bitstream.

In block 2006, the video encoder stores the video bitstream pending transmission toward a video decoder. In an embodiment, the video encoder transmits the video bitstream toward the video decoder.

Figure 21:
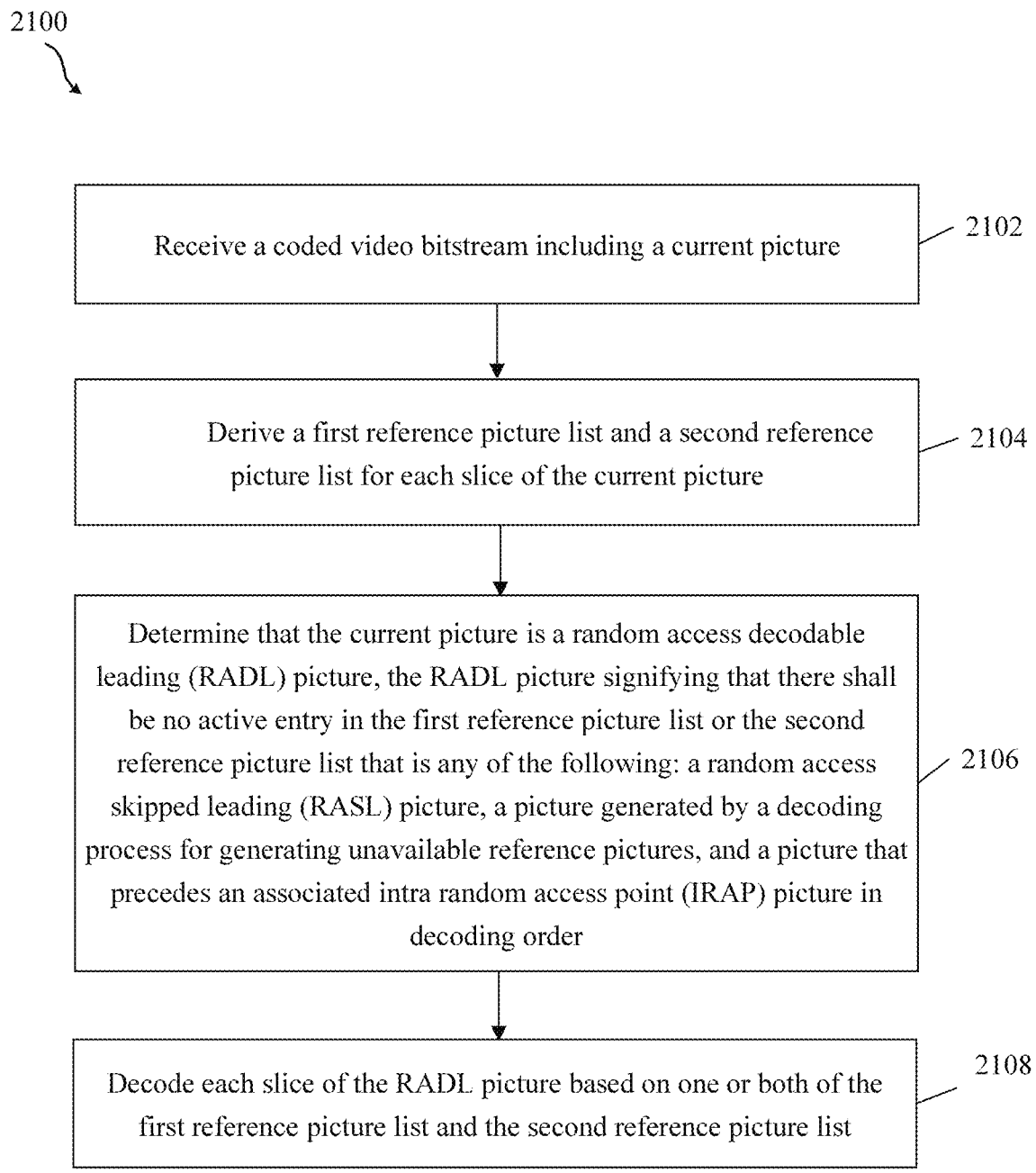
FIG. 21 is an embodiment of a method of decoding.

FIG. 21 is an embodiment of a method 2100 of decoding. The method 2100 can be employed by a video decoder (e.g., decoder 400). The method 2100 may be performed after a coded video bitstream has been directly or indirectly received from a video encoder (e.g., video encoder 300). The method 2100 improves the decoding process by constraining reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Therefore, as a practical matter, the performance of a codec is improved, which leads to a better user experience.

In block 2102, the video decoder receives a coded video bitstream including a current picture. In block 2104, the video decoder derives a first reference picture list and a second reference picture list for each slice of the current picture. In an embodiment, the reference picture lists are coded, constructed, or otherwise obtained by the decoder using information stored in the decoder, obtained at least in part from the bitstream, and so on.

In block 2106, the video decoder determines that the current picture is a random access decodable leading (RADL) picture. The RADL picture signifying that there shall be no active entry in the first reference picture list or the second reference picture list that is any of the following: a random access skipped leading (RASL) picture, a picture generated by a decoding process for generating unavailable reference pictures, and a picture that precedes an associated intra random access point (TRAP) picture in decoding order. In an embodiment, any of the following may mean any one of the following.

In an embodiment, the decoding process for generating unavailable reference pictures is invoked once per coded picture for a clean random access (CRA) picture with a NoOutPutBeforeRecoveryFlag equal to one or a gradual decoding refresh (GDR) picture with the NoOutPutBeforeRecoveryFlag equal to one.

In block 2108, the video decoder decodes each slice of the RADL picture based on one or both of the first reference picture list and the second reference picture list. In an embodiment, the method 2100 further comprises displaying, on a display of the video decoder, an image generated based on the RADL picture.

Figure 22:
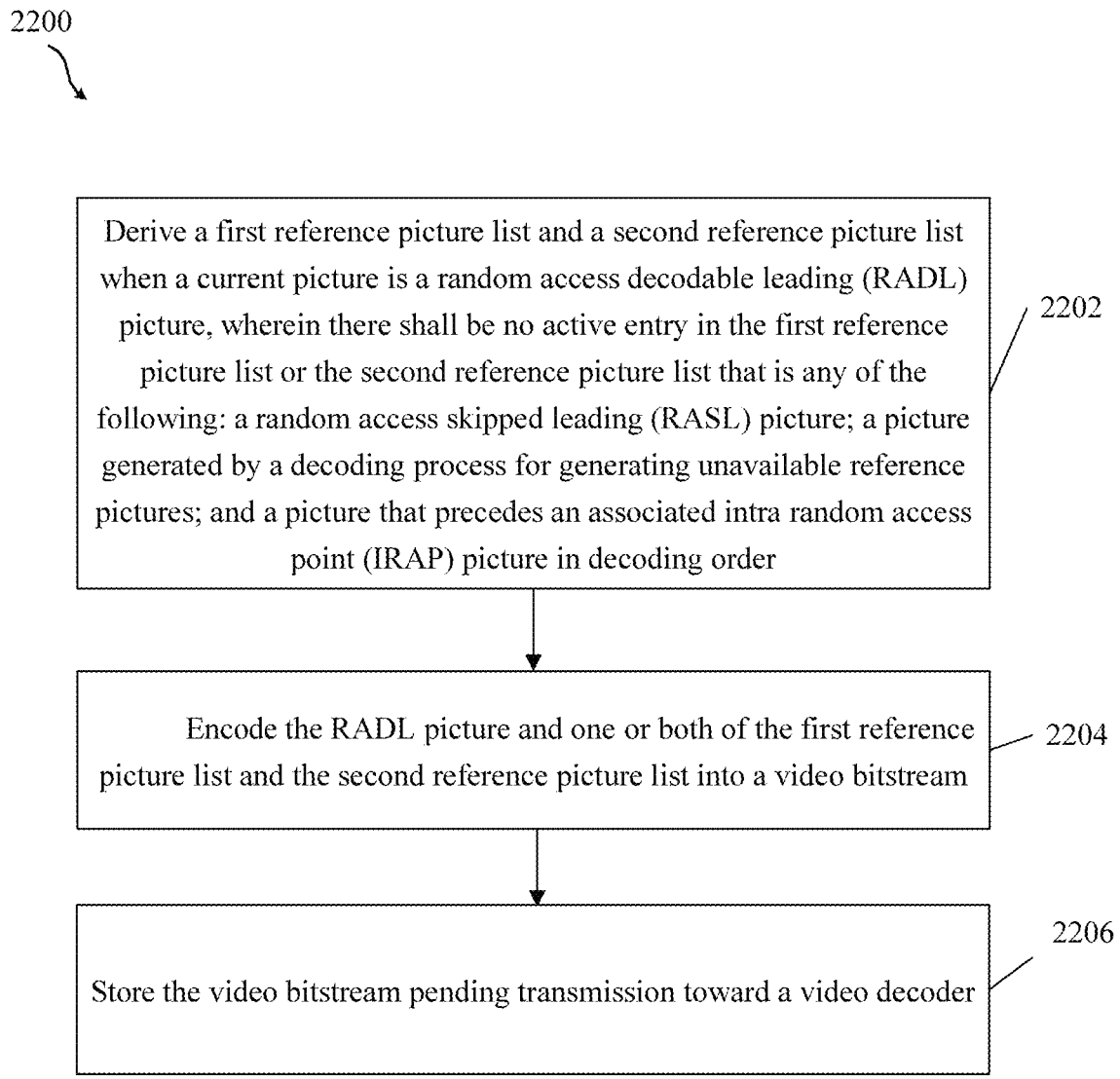
FIG. 22 is an embodiment of a method of encoding.

FIG. 22 is an embodiment of a method 2200 of encoding. The method 2200 can be employed by a video encoder (e.g., video encoder 300). The method may be performed when a picture (e.g., from a video) is to be encoded into a video bitstream and then transmitted toward a video decoder (e.g., video decoder 400). The method 2200 improves the encoding process by constraining reference picture lists from including an entry that refers to certain pictures when a current picture is a particular type of picture (e.g., a CRA picture, a trailing picture, a trailing picture that follows in both decoding order and output order one or more leading pictures associated with the same IRAP picture, and a RADL picture). By limiting reference picture lists in this way, coding errors and the amount of bandwidth and/or the network resources needed for coding may be reduced relative to conventional coding techniques. Therefore, as a practical matter, the performance of a codec is improved, which leads to a better user experience.

In block 2202, the video encoder derives a first reference picture list and a second reference picture list when a current picture is a random access decodable leading (RADL) picture, wherein there shall be no active entry in the first reference picture list or the second reference picture list that is any of the following: a random access skipped leading (RASL) picture, a picture generated by a decoding process for generating unavailable reference pictures, and a picture that precedes an associated intra random access point (IRAP) picture in decoding order. In an embodiment, the decoding process for generating unavailable reference pictures is invoked once per coded picture for a clean random access (CRA) picture with a NoOutPutBeforeRecoveryFlag equal to one or a gradual decoding refresh (GDR) picture with the NoOutPutBeforeRecoveryFlag equal to one. In an embodiment, the reference picture lists are coded, constructed, or otherwise obtained by the encoder using information stored in the encoder, obtained at least in part from the bitstream, and so on.

In block 2204, the video encoder encodes the RADL picture and one or both of the first reference picture list and the second reference picture list into a video bitstream.

In block 2206, the video encoder stores the video bitstream pending transmission toward a video decoder. In an embodiment, the video encoder transmits the video bitstream toward the video decoder.

Figure 23:
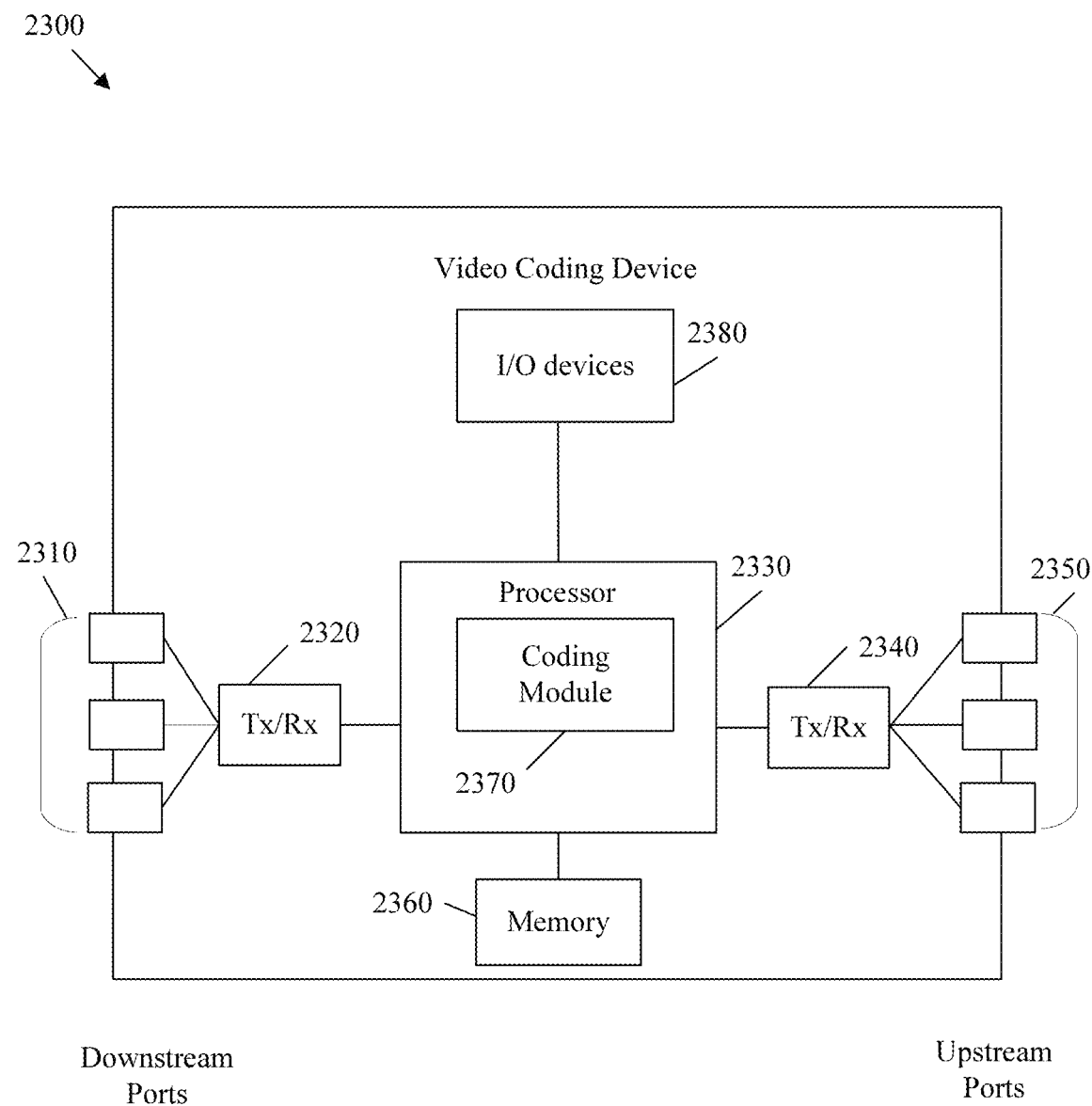
FIG. 23 is a schematic diagram of an example video coding device.

FIG. 23 is a schematic diagram of an example video coding device 2300. The video coding device 2300 is suitable for implementing the disclosed examples/embodiments as described herein. The video coding device 2300 comprises downstream ports 2310, upstream ports 2350, and/or transceiver units (Tx/Rx) 2320, 2340, including transmitters and/or receivers for communicating data upstream and/or downstream over a network. The video coding device 2300 also includes a processor 2330 including a logic unit and/or central processing unit (CPU) to process the data and a memory 2360 for storing the data. The video coding device 2300 may also comprise electrical, optical-to-electrical (OE) components, electrical-to-optical (EO) components, and/or wireless communication components coupled to the upstream ports 2350 and/or downstream ports 2310 for communication of data via electrical, optical, or wireless communication networks. The video coding device 2300 may also include input and/or output (I/O) devices 2380 for communicating data to and from a user. The I/O devices 2380 may include output devices such as a display for displaying video data, speakers for outputting audio data, etc. The I/O devices 2380 may also include input devices, such as a keyboard, mouse, trackball, etc., and/or corresponding interfaces for interacting with such output devices.

The processor 2330 is implemented by hardware and software. The processor 2330 may be implemented as one or more CPU chips, cores (e.g., as a multi-core processor), field-programmable gate arrays (FPGAs), application specific integrated circuits (ASICs), and digital signal processors (DSPs). The processor 2330 is in communication with the downstream ports 2310, Tx/Rx 2320, 2340, upstream ports 2350, and memory 2360. The processor 2330 comprises a coding module 2314. The coding module 2370 implements the disclosed embodiments described herein and may also implement any other method/mechanism described herein. Further, the coding module 2370 may implement a codec system 200, an encoder 300, and/or a decoder 400. For example, the coding module 2370 can be employed to code an inter-layer residual prediction (ILRP) flag and/or an ILRP layer indicator in a reference picture structure in order to manage reference pictures to support inter-layer prediction as described above. Hence, coding module 2370 causes the video coding device 2300 to provide additional functionality and/or coding efficiency when coding video data. As such, the coding module 2314 improves the functionality of the video coding device 2300 as well as addresses problems that are specific to the video coding arts. Further, the coding module 2370 effects a transformation of the video coding device 2300 to a different state. Alternatively, the coding module 2370 can be implemented as instructions stored in the memory 2360 and executed by the processor 2330 (e.g., as a computer program product stored on a non-transitory medium).

The memory 2360 comprises one or more memory types such as disks, tape drives, solid-state drives, read only memory (ROM), random access memory (RAM), flash memory, ternary content-addressable memory (TCAM), static random-access memory (SRAM), etc. The memory 2360 may be used as an over-flow data storage device, to store programs when such programs are selected for execution, and to store instructions and data that are read during program execution.

Figure 24:
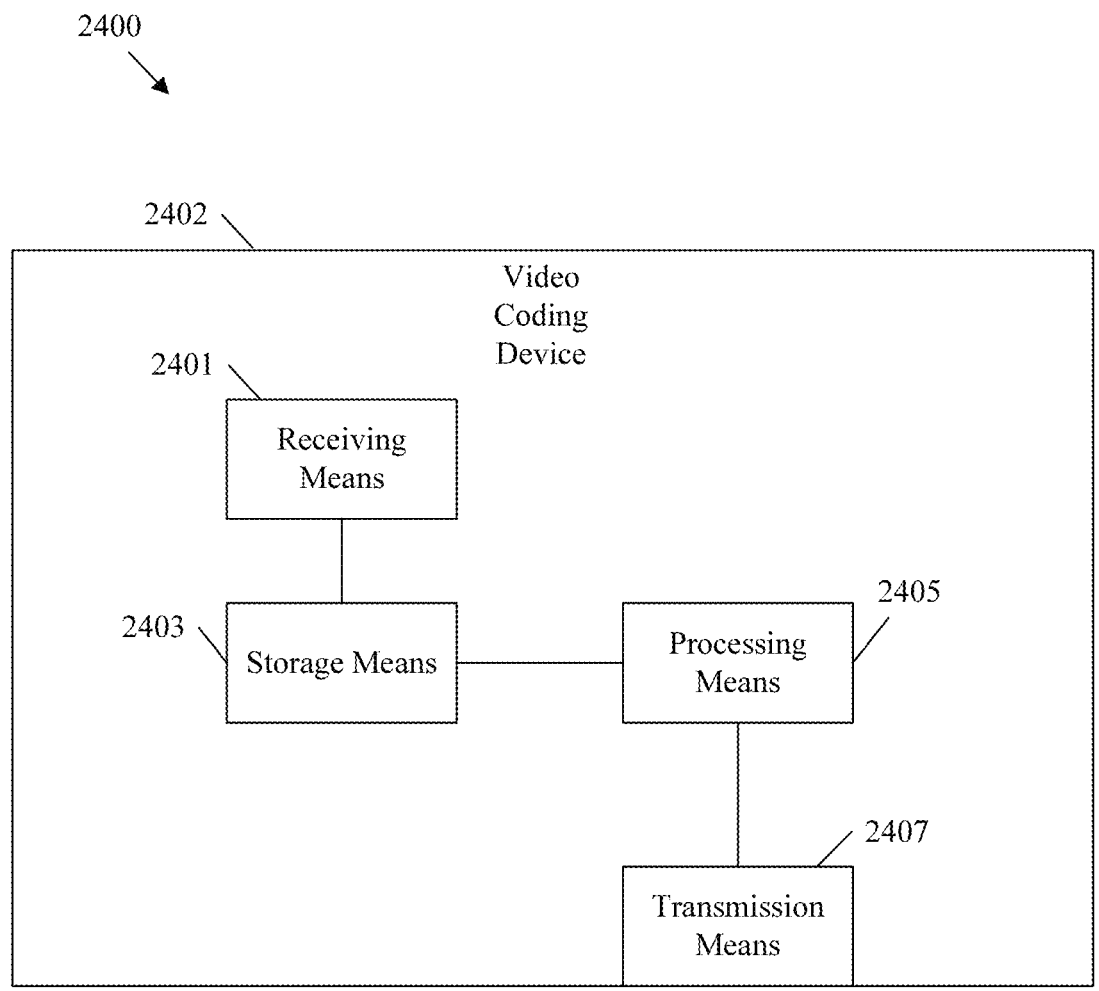
FIG. 24 is a schematic diagram of an embodiment of a means for coding.

FIG. 24 is a schematic diagram of an embodiment of a means for coding 2400. In an embodiment, the means for coding 2400 is implemented in a video coding device 2402 (e.g., a video encoder 300 or a video decoder 400). The video coding device 2402 includes receiving means 2401. The receiving means 2401 is configured to receive a picture to encode or to receive a bitstream to decode. The video coding device 2402 includes transmission means 2407 coupled to the receiving means 2401. The transmission means 2407 is configured to transmit the bitstream to a decoder or to transmit a decoded image to a display means (e.g., one of the I/O devices 2380).

The video coding device 2402 includes a storage means 2403. The storage means 2403 is coupled to at least one of the receiving means 2401 or the transmission means 2407. The storage means 2403 is configured to store instructions. The video coding device 2402 also includes processing means 2405. The processing means 2405 is coupled to the storage means 2403. The processing means 2405 is configured to execute the instructions stored in the storage means 2403 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of decoding implemented by a video decoder, comprising:
   receiving a coded video bitstream including a current picture;
   deriving a first reference picture list and a second reference picture list for each slice of the current picture;
   determining that the current picture is a trailing picture that follows, in both decoding order and output order, one or more leading pictures associated with a same intra random access point (IRAP) picture encoded, wherein there shall be no picture referred to by an entry in the first reference picture list or the second reference picture list that precedes the same IRAP picture in the decoding order, and wherein a decoding process for generating unavailable reference pictures is invoked once per coded picture for a clean random access (CRA) picture with a NoOutPutBeforeRecoveryFlag equal to one; and decoding each slice of the trailing picture based on one or both of the first reference picture list and the second reference picture list.

2. The method of claim 1, wherein the same IRAP picture starts a coded video sequence (CVS) that contains the trailing picture and the one or more leading pictures.

3. The method of claim 1, wherein the same IRAP picture is decoded using intra prediction, and wherein the trailing picture and the one or more leading pictures are decoded using inter prediction.

4. A method of encoding implemented by a video encoder, the method comprising:

deriving a first reference picture list and a second reference picture list when a current picture is a trailing picture that follows, in both decoding order and output order, one or more leading pictures associated with a same intra random access point (IRAP) picture, wherein there shall be no picture referred to by an entry in the first reference picture list or the second reference picture list that precedes the same IRAP picture in the decoding order;

setting a NoOutPutBeforeRecoveryFlag equal to one to indicate to a video decoder that a decoding process for generating unavailable reference pictures is invoked once per coded picture for a clean random access (CRA) picture;

encoding the trailing picture and one or both of the first reference picture list and the second reference picture list into a video bitstream; and storing the video bitstream pending transmission toward the video decoder.

5. The method of claim 4, wherein the same IRAP picture starts a coded video sequence (CVS) that contains the trailing picture and the one or more leading pictures.

6. The method of claim 4, wherein the same IRAP picture is encoded into the video bitstream using intra prediction, and wherein the trailing picture and the one or more leading pictures are encoded using inter prediction.

7. A decoding device, comprising:

a receiver configured to receive a coded video bitstream including a current picture;

a memory coupled to the receiver, the memory storing instructions; and one or more processors coupled to the memory, the one or more processors configured to execute the instructions to cause the decoding device to:

derive a first reference picture list and a second reference picture list for each slice of the current picture;

determine that the current picture is a trailing picture that follows, in both decoding order and output order, one or more leading pictures associated with a same intra random access point (IRAP) picture, wherein there shall be no picture referred to by an entry in the first reference picture list or the second reference picture list that precedes the same IRAP picture in the decoding order, and wherein a decoding process for generating unavailable reference pictures is invoked once per coded picture for a clean random access (CRA) picture with a NoOutPutBeforeRecoveryFlag equal to one; and decode each slice of the trailing picture based on one or both of the first reference picture list and the second reference picture list.

8. The decoding device of claim 7, wherein the same IRAP picture starts a coded video sequence (CVS) that contains the trailing picture and the one or more leading pictures.

9. The decoding device of claim 7, wherein the same IRAP picture is decoded using intra prediction, and wherein the trailing picture and the one or more leading pictures are decoded using inter prediction.

10. An encoding device, comprising:

a memory containing instructions;

one or more processors coupled to the memory, the one or more processors configured to implement the instructions to cause the encoding device to:

derive a first reference picture list and a second reference picture list when a current picture is a trailing picture that follows, in both decoding order and output order, one or more leading pictures associated with a same intra random access point (IRAP) picture, wherein there shall be no picture referred to by an entry in the first reference picture list or the second reference picture list that precedes the same IRAP picture in the decoding order;

set a NoOutPutBeforeRecoveryFlag equal to one to indicate to a video decoder that a decoding process for generating unavailable reference pictures is invoked once per coded picture for a clean random access (CRA) picture;

encode the trailing picture and one or both of the first reference picture list and the second reference picture list into a video bitstream; and a transmitter coupled to the one or more processors, the transmitter configured to transmit the video bitstream toward the video decoder.

11. The encoding device of claim 10, wherein the same IRAP picture starts a coded video sequence (CVS) that contains the trailing picture and the one or more leading pictures.

12. The encoding device of claim 10, wherein the same IRAP picture is encoded into the video bitstream using intra prediction, and wherein the trailing picture and the one or more leading pictures are encoded using inter prediction.

13. The encoding device of claim 10, wherein the memory stores the video bitstream prior to the transmitter transmitting the video bitstream toward the video decoder.

* * * * *

UNITED STATES PATENT AND TRADEMARK OFFICE
CERTIFICATE OF CORRECTION

Page 1 of 1

PATENT NO. : 12,323,578 B2
APPLICATION NO. : 17/566464
DATED : June 3, 2025
INVENTOR(S) : Ye-Kui Wang et al.

It is certified that error appears in the above-identified patent and that said Letters Patent is hereby corrected as shown below:

On the Title Page

On Page 2, (56) References Cited, Other Publications, Column Two:

Delete "Bross, et al., "Versatile Video Coding (Draft 5)," Joint Video Experts Team (JVET) of ITU-T SG 16 WP 3 and ISO/IEC UTC 1/SC 29/WG 11, 14th Meeting: Geneva, CH, Mar. 19-27, 2019, JVET-N1001-v3, 371 pages." and insert -- Bross, et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages. --

Delete "Rickard Sjöberg, et al, AHG17: Bitstream constraints on RPL and GDR, Joint Video Experts Team (JVET) of ITU-T SG 16 WP 3 and ISO/IEC JTC 1/SC 29/WVG 11, 16th Meeting: Geneva, CH, Oct. 1-11, 2019, Document: JVET-P0356, total 7 pages." and insert -- Rickard Sjöberg, et al, AHG17: Bitstream constraints on RPL and GDR, Joint Video Experts Team (JVET) of ITU-T SG 16 WP 3 and ISO/IEC JTC 1/SC 29/WG 11, 16th Meeting: Geneva, CH. Oct. 1-11, 2019, Document: JVET-P0356, total 7 pages. --

Insert -- Chen, et al., "Joint Collaborative Team on Video Coding (JCT-VC) of ITU-T SG16 WP3 and ISO/IEC JTC1/SC29/WG11," In: "12th Meeting: Geneva. 23 January 2013 (23.01.2013) Retrieved on 24 August 2020 (24.08.2020) from
<https://www.researchgate.net/profile/Jill_Boyce2/publication/326979825_Joint_Collaborative_Team_on_Video_Coding_JCT-VC_of_ITU-T_SG16_WP3_and_ISOIEC_JTC1SC29WG11/links/5b6f59ac92851ca65055f98a/Joint-Collaborative-Team-on-Video-Coding-JCT-VC-of-ITU-T-SG16-WP3-and-ISO-IEC-JTC1-SC29-WG11.pdf>, 40 pgs. --

Signed and Sealed this
Fifteenth Day of July, 2025

Coke Morgan Stewart
*Acting Director of the United States Patent and Trademark Office*